(12) United States Patent
Heckel et al.

(10) Patent No.: US 10,878,181 B2
(45) Date of Patent: Dec. 29, 2020

(54) REMOVING PERSONAL INFORMATION FROM TEXT USING A NEURAL NETWORK

(71) Applicant: ASAPP, INC., New York, NY (US)

(72) Inventors: Frederick William Poe Heckel, New York, NY (US); Shawn Henry, Longmont, CO (US)

(73) Assignee: ASAPP, INC., New York, NY (US)

( * ) Notice: Subject to any disclaimer, the term of this patent is extended or adjusted under 35 U.S.C. 154(b) by 43 days.

(21) Appl. No.: 16/189,337

(22) Filed: Nov. 13, 2018

(65) Prior Publication Data

US 2019/0332658 A1 Oct. 31, 2019

Related U.S. Application Data

(63) Continuation of application No. 15/964,629, filed on Apr. 27, 2018, now Pat. No. 10,169,315.

(51) Int. Cl.
*G06F 17/20* (2006.01)
*G06F 40/166* (2020.01)
(Continued)

(52) U.S. Cl.
CPC ............ *G06F 40/166* (2020.01); *G06F 40/30* (2020.01); *G06N 3/0454* (2013.01); *G06N 3/08* (2013.01);
(Continued)

(58) Field of Classification Search
CPC ..... G06F 40/166; G06F 40/30; G06N 3/0454; G06N 3/08; G06N 3/084; G06N 7/005; G06N 3/0445; G06N 3/0481
See application file for complete search history.

(56) References Cited

U.S. PATENT DOCUMENTS

| 5,195,034 A | 3/1993 | Garneau et al. |
| 5,227,971 A | 7/1993 | Nakajima et al. |

(Continued)

FOREIGN PATENT DOCUMENTS

| CN | 1633817 A | 6/2005 |
| CN | 105009556 A | 10/2015 |

(Continued)

OTHER PUBLICATIONS

"Scikit-learn: Machine Learning in Python", scikit-learn 0.17.1 documentation, http://scikit-learn.org/stable/ (accessed on Sep. 20, 2016), 3 pages.

(Continued)

*Primary Examiner* — Keith D Bloomquist
(74) *Attorney, Agent, or Firm* — GTC Law Group PC & Affiliates

(57) ABSTRACT

A neural network may be used to remove personal information from text (such as names, addresses, credit card numbers, or social security numbers), and replace the personal information with a label indicating the type or class of the removed information. The neural network may comprise multiple layers that compute a context vector for words of the text, compute label scores for words of the text using the context vectors, and select a label for each word using the label scores. Words corresponding to certain labels may be replaced with a label, such as replacing the digits of a credit card number with a label <cc_number>. The redacted text may then be presented to a person or stored for later processing.

21 Claims, 8 Drawing Sheets

(51) Int. Cl.
  *G06N 3/08* (2006.01)
  *G06N 3/04* (2006.01)
  *G06F 40/30* (2020.01)
  *G06N 7/00* (2006.01)

(52) U.S. Cl.
  CPC ........... *G06N 3/0445* (2013.01); *G06N 3/084* (2013.01); *G06N 7/005* (2013.01)

(56) References Cited

U.S. PATENT DOCUMENTS

| | | | |
|---|---|---|---|
| 5,369,575 | A | 11/1994 | Lamberti et al. |
| 6,173,279 | B1 | 1/2001 | Levin et al. |
| 6,177,932 | B1 | 1/2001 | Galdes et al. |
| 6,327,363 | B1 | 12/2001 | Henderson et al. |
| 6,381,645 | B1 | 4/2002 | Sassin et al. |
| 6,453,292 | B2 | 9/2002 | Ramaswamy et al. |
| 6,915,254 | B1 | 7/2005 | Heinze et al. |
| 6,981,040 | B1 | 12/2005 | Konig et al. |
| 7,257,564 | B2 | 8/2007 | Loughmiller et al. |
| 7,603,330 | B2 | 10/2009 | Gupta et al. |
| 7,644,057 | B2 | 1/2010 | Nelken et al. |
| 8,024,196 | B1 | 9/2011 | Wodtke et al. |
| 8,054,951 | B1 | 11/2011 | Winslow et al. |
| 8,156,138 | B2 | 4/2012 | Kohn et al. |
| 8,271,403 | B2 | 9/2012 | Rieck et al. |
| 8,494,152 | B1 | 7/2013 | Roberts et al. |
| 8,577,671 | B1 | 11/2013 | Barve et al. |
| 8,626,509 | B2 | 1/2014 | Roy et al. |
| 9,043,197 | B1 | 5/2015 | Pasca et al. |
| 9,336,269 | B1 | 5/2016 | Smith et al. |
| 9,591,136 | B1 | 3/2017 | Garcia et al. |
| 9,602,987 | B1 | 3/2017 | Wittig |
| 9,715,496 | B1 | 7/2017 | Sapoznik et al. |
| 9,723,151 | B2 | 8/2017 | McGann et al. |
| 9,727,925 | B2 | 8/2017 | Subramanian, Sr. et al. |
| 9,742,916 | B1 | 8/2017 | Christopher |
| 9,761,222 | B1 | 9/2017 | Scarasso et al. |
| 9,762,733 | B1 | 9/2017 | Ramanujaiaha et al. |
| 9,805,371 | B1 | 10/2017 | Sapoznik et al. |
| 9,807,037 | B1 | 10/2017 | Sapoznik et al. |
| 9,875,440 | B1 | 1/2018 | Commons |
| 9,892,414 | B1 | 2/2018 | Henry |
| 10,049,663 | B2 | 8/2018 | Orr et al. |
| 10,067,938 | B2 | 9/2018 | Bellegarda |
| 10,083,451 | B2 | 9/2018 | Sehrawat et al. |
| 10,083,690 | B2 | 9/2018 | Giuli et al. |
| 10,089,072 | B2 | 10/2018 | Piersol et al. |
| 10,097,690 | B1 | 10/2018 | Henry |
| 10,109,275 | B2 | 10/2018 | Henry |
| 10,127,908 | B1 | 11/2018 | Deller et al. |
| 10,169,315 | B1 | 1/2019 | Heckel et al. |
| 10,210,244 | B1 | 2/2019 | Branavan et al. |
| 10,387,888 | B2 | 8/2019 | Sapoznik et al. |
| 10,453,074 | B2 | 10/2019 | Sapoznik et al. |
| 10,482,875 | B2 | 11/2019 | Henry |
| 10,489,792 | B2 | 11/2019 | Hackman et al. |
| 10,497,004 | B2 | 12/2019 | Shaev et al. |
| 2003/0033288 | A1 | 2/2003 | Shanahan et al. |
| 2003/0033347 | A1 | 2/2003 | Bolle et al. |
| 2003/0103621 | A1 | 6/2003 | Brown et al. |
| 2004/0003283 | A1 | 1/2004 | Goodman et al. |
| 2004/0254904 | A1 | 12/2004 | Nelken et al. |
| 2005/0076084 | A1 | 4/2005 | Loughmiller et al. |
| 2005/0105712 | A1 | 5/2005 | Williams et al. |
| 2005/0228790 | A1 | 10/2005 | Ronnewinkel et al. |
| 2006/0112127 | A1 | 5/2006 | Krause et al. |
| 2006/0173776 | A1 | 8/2006 | Shalley et al. |
| 2007/0094217 | A1 | 4/2007 | Ronnewinkel et al. |
| 2007/0100618 | A1 | 5/2007 | Lee et al. |
| 2007/0121899 | A1 | 5/2007 | Galvin |
| 2007/0168448 | A1 | 7/2007 | Garbow et al. |
| 2008/0091435 | A1 | 4/2008 | Strope et al. |
| 2008/0112620 | A1 | 5/2008 | Jiang |
| 2008/0168070 | A1 | 7/2008 | Naphade et al. |
| 2008/0168135 | A1 | 7/2008 | Redlich et al. |
| 2011/0066634 | A1 | 3/2011 | Phillips et al. |
| 2011/0082825 | A1 | 4/2011 | Sathish et al. |
| 2011/0093414 | A1 | 4/2011 | Xu et al. |
| 2011/0173346 | A1 | 7/2011 | Neben |
| 2011/0239113 | A1* | 9/2011 | Hung .................... G16H 15/00 715/271 |
| 2011/0270771 | A1 | 11/2011 | Coursimault et al. |
| 2011/0286596 | A1 | 11/2011 | Gressel et al. |
| 2011/0314012 | A1 | 12/2011 | Kenthapadi et al. |
| 2012/0005515 | A1 | 1/2012 | Reddi et al. |
| 2012/0053945 | A1 | 3/2012 | Gupta et al. |
| 2012/0102130 | A1 | 4/2012 | Guyot et al. |
| 2012/0266258 | A1 | 10/2012 | Tuchman et al. |
| 2013/0143587 | A1 | 6/2013 | Williams et al. |
| 2013/0144605 | A1 | 6/2013 | Brager et al. |
| 2013/0166485 | A1 | 6/2013 | Hoffmann et al. |
| 2013/0173604 | A1 | 7/2013 | Li et al. |
| 2013/0317808 | A1 | 11/2013 | Kruel et al. |
| 2014/0047234 | A1* | 2/2014 | Davis .................... H04L 63/107 713/160 |
| 2014/0075004 | A1 | 3/2014 | Van Dusen et al. |
| 2014/0079195 | A1 | 3/2014 | Srivastava et al. |
| 2014/0180788 | A1 | 6/2014 | George et al. |
| 2014/0278379 | A1 | 9/2014 | Coccaro et al. |
| 2014/0282138 | A1 | 9/2014 | Hopton et al. |
| 2014/0297268 | A1 | 10/2014 | Govrin et al. |
| 2014/0297281 | A1 | 10/2014 | Togawa et al. |
| 2014/0317030 | A1 | 10/2014 | Shen et al. |
| 2014/0330818 | A1 | 11/2014 | Raina et al. |
| 2014/0365209 | A1 | 12/2014 | Evermann |
| 2015/0006143 | A1 | 1/2015 | Skiba et al. |
| 2015/0032724 | A1 | 1/2015 | Thirugnanasundaram et al. |
| 2015/0052002 | A1 | 2/2015 | Welch et al. |
| 2015/0073798 | A1 | 3/2015 | Karov et al. |
| 2015/0142704 | A1 | 5/2015 | London |
| 2015/0149177 | A1 | 5/2015 | Kalns et al. |
| 2015/0154285 | A1 | 6/2015 | Saarinen et al. |
| 2015/0178390 | A1 | 6/2015 | Torras |
| 2015/0215624 | A1 | 7/2015 | Wei |
| 2015/0220833 | A1 | 8/2015 | Le |
| 2015/0220995 | A1 | 8/2015 | Guyot et al. |
| 2015/0228275 | A1 | 8/2015 | Watanabe et al. |
| 2015/0242385 | A1 | 8/2015 | Bao et al. |
| 2015/0310377 | A1 | 10/2015 | Duval Cyrille et al. |
| 2015/0340032 | A1 | 11/2015 | Gruenstein |
| 2015/0363393 | A1 | 12/2015 | Williams et al. |
| 2015/0365387 | A1 | 12/2015 | Good |
| 2016/0019816 | A1 | 1/2016 | Parry et al. |
| 2016/0063067 | A1 | 3/2016 | Maitra et al. |
| 2016/0078456 | A1 | 3/2016 | Chakraborty et al. |
| 2016/0092688 | A1 | 3/2016 | Wolrich et al. |
| 2016/0163311 | A1 | 6/2016 | Crook et al. |
| 2016/0163314 | A1 | 6/2016 | Fujii et al. |
| 2016/0180151 | A1 | 6/2016 | Philbin et al. |
| 2016/0180838 | A1 | 6/2016 | Parada San Martin et al. |
| 2016/0182672 | A1 | 6/2016 | Kuperman et al. |
| 2016/0239846 | A1 | 8/2016 | Arvapally et al. |
| 2016/0247068 | A1 | 8/2016 | Lin |
| 2016/0255034 | A1 | 9/2016 | Yuan |
| 2016/0323398 | A1 | 11/2016 | Guo et al. |
| 2016/0328388 | A1 | 11/2016 | Cao et al. |
| 2016/0364522 | A1 | 12/2016 | Frey et al. |
| 2017/0011279 | A1 | 1/2017 | Soldevila et al. |
| 2017/0013073 | A1 | 1/2017 | Mendez et al. |
| 2017/0091320 | A1 | 3/2017 | Psota et al. |
| 2017/0103324 | A1 | 4/2017 | Weston et al. |
| 2017/0116982 | A1 | 4/2017 | Gelfenbeyn et al. |
| 2017/0147682 | A1 | 5/2017 | Alaqeeli et al. |
| 2017/0148073 | A1 | 5/2017 | Nomula et al. |
| 2017/0200077 | A1 | 7/2017 | Weston et al. |
| 2017/0213138 | A1 | 7/2017 | Bojja et al. |
| 2017/0308523 | A1 | 10/2017 | Wang et al. |
| 2017/0323016 | A1 | 11/2017 | Feng et al. |
| 2018/0005112 | A1 | 1/2018 | Iso-Sipila et al. |
| 2018/0012231 | A1 | 1/2018 | Sapoznik et al. |
| 2018/0012232 | A1 | 1/2018 | Sehrawat et al. |
| 2018/0013699 | A1 | 1/2018 | Sapoznik et al. |
| 2018/0018562 | A1 | 1/2018 | Jung |

(56) References Cited

U.S. PATENT DOCUMENTS

| | | | |
|---|---|---|---|
| 2018/0032755 A1 | 2/2018 | Odinak | |
| 2018/0052664 A1 | 2/2018 | Zhang et al. | |
| 2018/0068233 A1 | 3/2018 | Miranda et al. | |
| 2018/0121738 A1 | 5/2018 | Womack et al. | |
| 2018/0131645 A1 | 5/2018 | Magliozzi et al. | |
| 2018/0143965 A1 | 5/2018 | Willson et al. | |
| 2018/0174037 A1 | 6/2018 | Henry | |
| 2018/0174579 A1 | 6/2018 | Henry | |
| 2018/0181807 A1 | 6/2018 | Yankov | |
| 2018/0203848 A1 | 7/2018 | Perez et al. | |
| 2018/0232434 A1 | 8/2018 | Geyik et al. | |
| 2018/0239830 A1 | 8/2018 | Dialani et al. | |
| 2018/0253734 A1 | 9/2018 | Henry | |
| 2018/0329886 A1 | 11/2018 | Li et al. | |
| 2018/0357439 A1* | 12/2018 | Osotio | G06N 20/00 |
| 2018/0365702 A1 | 12/2018 | Sehrawat et al. | |
| 2018/0376002 A1 | 12/2018 | Abraham | |
| 2019/0019197 A1 | 1/2019 | Roberts et al. | |
| 2019/0019503 A1 | 1/2019 | Henry | |
| 2019/0122101 A1 | 4/2019 | Lei | |
| 2019/0180288 A1 | 6/2019 | Shaev et al. | |
| 2019/0182383 A1 | 6/2019 | Shaev et al. | |
| 2019/0213601 A1 | 7/2019 | Hackman et al. | |
| 2019/0311375 A1 | 10/2019 | Sapoznik et al. | |
| 2020/0019609 A1 | 1/2020 | Yu et al. | |
| 2020/0042613 A1 | 2/2020 | Jiang et al. | |

FOREIGN PATENT DOCUMENTS

| | | |
|---|---|---|
| WO | 2018009231 A1 | 1/2018 |
| WO | 2018009432 A1 | 1/2018 |
| WO | 2018160492 A1 | 9/2018 |
| WO | 2019113409 A1 | 6/2019 |
| WO | 2019113409 A8 | 7/2019 |

OTHER PUBLICATIONS

"Using algorithms for advanced customer care", Nokia Strategic white paper, https://resources.ext.nokia.com/asset/200614 (accessed Jul. 26, 2017), 2017, 11 pages.

16908347.4, "European Application Serial No. 16908347.4, Extended European Search Report dated Nov. 20, 2019", ASAPP, Inc., 11 pages.

Al-Rfou, Rami et al., "Conversational Contextual Cues: The Case of Personalization and History for Response Ranking", CoRR abs/1606.00372, http://arxiv.org/abs/1606.00372, 2016, 10 pages.

Bahdanau, Dzmitry et al., "Neural Machine Translation by Jointly Learning to Align and Translate", CoRR abs/1409.0473, http://arxiv.org/abs/1409.0473, May 19, 2016, 15 pages.

Bengio, Yoshua et al., "A Neural Probabilistic Language Model", Journal of Machine Learning Research, vol. 3 accessed at http://www.jmlr.org/papers/volume3/bengio03a/bengio03a.pdf, 2003 (accessed on Jan. 3, 2017), pp. 1137-1155.

Berger, Mark J, "Large Scale Multi-label Text Classification with Semantic Word Vectors", published 2015 (Year: 2015), Department of Computer Science, Stanford University, Stanford, CA 94305, mjberger@stanford.edu, 2015, pp. 1-8.

Black, William J. et al., "Facile: Description of the NE System Used for MUC-7", Proceedings of the 7th Message Understanding Conference, https://www-nlpir.nist.gov/related_projects/muc/proceedings/muc_7_proceedings/facile_muc7.pdf, 1998, 10 pages.

Blei, David M. et al., "Latent Dirichlet Allocation", Journal of Machine Learning Research, vol. 3, 2003, pp. 993-1022.

Brown, Peter F. et al., "Class-Based n-gram Models of Natural Language", Computational Linguistics, vol. 18, No. 4, accessed at http://aclweb.org/anthology/J/J92/J92-4003.pdf, 1992, pp. 467-479 (accessed on Jan. 3, 2017).

Cai, Lijuan et al., "Hierarchical Document Categorization with Support Vector Machines", CIKM'04, Washington, DC, USA, https://info.cs.uab.edu/zhang/Spam-mining-papers/Hierarchical.Data.Classification.with.Support.Vector.Machines.pdf, Nov. 8-13, 2004, 10 pages.

Carrier, Pierre L. et al., "LSTM Networks for Sentiment Analysis", http://deeplearning.net/tutorial/lstm.html, accessed on Sep. 20, 2016, 5 pages.

Chandar, Sarath et al., "Correlational Neural Networks", CoRR abs/1504.07225, http://arxiv.org/abs/1504.07225, Oct. 12, 2015, 27 pages.

Chen, Wenlin et al., "Compressing Neural Networks with the Hashing Trick", arXiv:1504.04788v1, https://arxiv.org/pdf/1504.04788.pdf (accessed on Nov. 26, 2018), Apr. 19, 2015, 10 pages.

Chen, Yun-Nung et al., "An empirical investigation of sparse log-linear models for improved dialogue act classification", IEEE International Conference on Acoustics Speech and Signal Processing, 2013, XP032507868, 6 pages.

Chen, Yun-Nung et al., "An empirical investigation of sparse log-linear models for improved dialogue act classification", 2013 IEEE International Conference on Acoustics. Speech and Signal Processing. IEEE, 2013, 6 pages.

Chen, Yun-Nung, "An empirical investigation of sparse log-linear models for improved dialogue act classification.", 2013 IEEE International Conference on Acoustics, Speech and Signal Processing. IEEE, 2013, pp. 1-6.

Cheng, Yong et al., "Semi-Supervised Learning for Neural Machine Translation", CoRR abs/1606.04596, http://arxiv.org/abs/1606.04596, Dec. 10, 2016, 10 pages.

Collados, Jose C, "On the contribution of neural networks and word embeddings in Natural Language Processing", published at Medium.com, Jan. 2018. (Year: 2018), http://www.josecamachocollados.com, Jan. 2018, pp. 1-7.

Courbariaux, Matthieu et al., "BinaryConnect: Training Deep Neural Networks with binary weights during propagations", CoRR, accessed at https://arxiv.org/pdf/1511.00363v3.pdf, 2015 (Jan. 3, 2017), 9 pages.

De La Briandais, Rene, "File Searching Using Variable Length Keys", Proceedings of the 1959 Western Joint Computer Conference, https://pdfs.semanticscholar.org/3ce3/f4cc1c91d03850ed84ef96a08498e018d18f.pdf, 1959, pp. 295-298.

Deerwester, Scott et al., "Improving Information Retrieval with Latent Semantic Indexing", Proceedings of the 51st ASIS Annual Meeting (ASIS '88), vol. 25, Oct. 1988, pp. 36-40.

Deerwester, Scott et al., "Indexing by Latent Semantic Analysis", Journal of the Association for Information Science and Technology, vol. 41, iss. 6, Sep. 1990, pp. 391-407.

Frome, Andrea et al., "Large-scale Privacy Protection in Google Street View", 2009 IEEE 12th International Conference on Computer Vision https://pdfs.semanticscholar.org/e645/6ac0e57396f222689dc71a310c2779a31488.pdf, Sep. 29-Oct. 2, 2009, 8 pages.

Gong, Yunchao et al., "Iterative Quantization: A Procrustean Approach to Learning Binary Codes", CVPR 2011, accessed at http://www.cs.unc.edu/~lazebnik/publications/cvpr11_small_code.pdf, 2011 (accessed on Jan. 3, 2017), pp. 817-824.

Goodfellow, Ian J. et al., "Generative Adversarial Nets", Advances in Neural Information Processing Systems 27 (NIPS 2014), https://papers.nips.cc/paper/5423-generative-adversarial-nets.pdf, 2014, pp. 2672-2680.

Gray, R., "Vector quantization", IEEE ASSP Magazine, vol. 1, iss. 2 https://ieeexplore.ieee.org/document/1162229/ (abstract only), Apr. 1984, pp. 4-29.

Henderson, Matthew et al., "Efficient Natural Language Response Suggestion for Smart Reply", arXiv:1705.00652v1, https://arxiv.org/pdf/1705.00652.pdf, May 1, 2017, 15 pages.

Hochreiter, Sepp et al., "Long Short-Term Memory", Neural Computation, vol. 9, iss. 8, 1997, pp. 1735-1780.

Hochreitner, Sepp et al., "Long Short-Term Memory", Neural Computation, vol. 9, Iss. 8, accessed at http://deeplearning.cs.cmu.edu/pdfs/Hochreiter97_lstm.pdf, 1997 (accessed on Jan. 3, 2017), pp. 1735-1780.

Huang, Zhiheng et al., "Bidirectional LSTM-CRF Models for Sequence Tagging", arXiv:1508.01991v1, https://arxiv.org/pdf/1508.01991.pdf, Aug. 9, 2015, 10 pages.

(56) References Cited

OTHER PUBLICATIONS

Iyyer, Mohit et al., "Deep Unordered Composition Rivals Syntactic Methods for Text Classification", Association for Computational Linguistics (ACL), http://cs.umd.edu/~miyyer/pubs/2015_acl_dan.pdf, 2015, 11 pages.

Ji, Zongcheng et al., "An Information Retrieval Approach to Short Text Conversation", CoRR, accessed at https://arxiv.org/pdf/1408.6988v1.pdf, Aug. 29, 2014 (accessed on Jan. 3, 2017), 21 pages.

Karpathy, Andre J, "The Unreasonable Effectiveness of Recurrent Neural Networks", http://karpathy.github.io/2015/05/21/rnn-effectiveness/, (accessed on Sep. 20, 2016), May 21, 2015, 42 pages.

Kim, Yoon et al., "Character-Aware Neural Language Models", CoRR abs/1508.06615, http://arxiv.org/abs/1508.06615, 2015, 9 pages.

Kim, Yoon, "Convolutional Neural Networks for Sentence Classification", Proceedings of the 2014 Conference on Empirical Methods in Natural Language Processing (EMNLP), Oct. 25-29, 2014, Doha, Qatar, 2014, pp. 1746-1751.

Kiros, Ryan et al., "Skip-Thought Vectors", Proceedings of the 28th International Conference on Neural Information Processing Systems, vol. 2., 2015, pp. 3294-3302.

Lafferty, John et al., "Conditional Random Fields: Probabilistic Models for Segmenting and Labeling Sequence Data", https://repository.upenn.edu/cgi/viewcontent.cgi?article=1162&context=cis_papers, The definitive version was published in Proceedings of the 18th International Conference on Machine Learning 2001 (ICML 2001), pp. 282-289, Jun. 2001, 10 pages.

Lai, Hanjiang et al., "Simultaneous Feature Learning and Hash Coding with Deep Neural Networks", CoRR, accessed at http://www.cv-foundation.org/openaccess/content_cvpr_2015/papers/Lai_Simultaneous_Feature-Learning_2015_CVPR_paper.pdf, 2015 (accessed Jan. 3, 2017), pp. 3270-3278.

Lai, Siwei et al., "Recurrent Convolutional Neural Networks for Text Classification", AAAI'15 Proceedings of the Twenty-Ninth AAAI Conference on Artificial Intelligence, 2015, pp. 2267-2273.

Lample, Guillaume et al., "Unsupervised Machine Translation Using Monolingual Corpora Only", CoRR abs/1711.00043, http://arxiv.org/abs/1711.00043, Oct. 31, 2017, 12 pages.

Larochelle, Hugo et al., "A Neural Autoregressive Topic Model", Advances in Neural Information Processing Systems 25, Editors: F. Pereira and C. J. C. Burges and L. Bottou and K. Q. Weinberger, Published by Curran Associates, Inc., 2012, pp. 2708-2716.

Le, Quoc et al., "Distributed Representations of Sentences and Documents", Proceedings of the 31st International Conference on Machine Learning, W&CP vol. 32, Beijing, China, 2014, 9 pages.

Lee, Cheongjae et al., "Robust Dialog Management with N-best Hypotheses Using Dialog Examples and Agenda", Proceedings of ACL-08: HLT, Columbus, Ohio, Jun. 2008, pp. 630-637.

Levy, Omer et al., "Neural Word Embedding as Implicit Matrix Factorization", Advances in Neural Information Processing Systems 27: Annual Conference on Neural Information Processing Systems 2014, Dec. 8-13, 2014, Montreal, Quebec, Canada, http://papers.nips.cc/paper/5477-neural-word-embedding-as-implicit-matrix-factorization.pdf, 2014, pp. 2177-2185.

Li, Jiwei et al., "A Hierarchical Neural Autoencoder for Paragraphs and Documents", Proceedings of the 53rd Annual Meeting of the Association for Computational Linguistics and the 7th International Joint Conference on Natural Language Processing,Beijing, China, http://web.standford.edu/~jurafsky/pubs/P15-1107.pdf, Jul. 26-31, 2015 (accessed on Jan. 3, 2017), pp. 1106-1115.

Lin, Hui et al., "Multi-document Summarization via Budgeted Maximization of Submodular Functions", In Proceed. of Human Language Technologies: The Conf. of the North American Chapter of the Association for Computational Linguistics (NAACL-HLT), (accessed Nov. 26, 2018 at https://pdfs.semanticscholar.org/6286/a97ae2d9cff9b69f14d6cee3c611a1a63379.pdf), 2010, pp. 912-920.

Lin, Zhouhan et al., "A Structured Self-Attentive Sentence Embedding", arXiv:1703.03130v1, https://arxiv.org/pdf/1703.03130.pdf (accessed Jul. 13, 2017), Mar. 9, 2017, 15 pages.

Logeswaran, Lajanugen et al., "An Efficient Framework for Learning Sentence Representations", International Conference on Learning Representations, https://openreview.net/pdf?id=rJvJXZb0W, 2018, 16 pages.

Logeswaran, Lajanugen et al., "An efficient framework for learning sentence representations", ICLR 2018 Conference Blind Submission, https://openreview.net/pdf?id=rJvJXZb0W (accessed Nov. 26, 2018), Feb. 15, 2018, 16 pages.

Miao, Yishu et al., "Neural Variational Inference for Text Processing", CoRR abs/1511.06038, http://arxiv.org/abs/1511.06038, 2015, 15 pages.

Mikolov, Tomas et al., "Distributed Representations of Words and Phrases and their Compositionality", CoRR abs/1310.4546, http://arxiv.org/abs/1310.4546, 2013, 9 pages.

Mikolov, Tomas et al., "Distributed Representations of Words and Phrases and their Compositionality", CoRR, accessed at https://papers.nips.cc/paper/5021-distributed-representations-of-words-and-phrases-and-their-compositionality.pdf, 2013 (accessed on Jan. 3, 2017), 9 pages.

Mikolov, Tomas et al., "Recurrent neural network based language model", Interspeech 2010, Sep. 26-30, 2010, Makuhari, Chiba, Japan, 2010, pp. 1045-1048.

Mikolov, Tomas et al., "Recurrent neural network based language model", Interspeech 2010, Makuhari, Chiba, Japan, accessed at http://www.fit.vutbr.cz/research/groups/speech/publi/2010/mikolov_interspeech2010IS100722.pdf, Sep. 26-30, 2010 (accessed on Jan. 3, 2017), pp. 1045-1048.

Mühler, Vincent, "Building a Node.js WebSocket Chat App with Socket.io and React", Tutorial to Socket.io with JavaScript, Feb. 22, 2018, 12 pages.

Pagliardini, Matteo et al., "Unsupervised Learning of Sentence Embeddings using Compositional n-Gram Features", CoRR abs/1703.02507, http://arxiv.org/abs/1703.02507, Jul. 10, 2017, 11 pages.

PCT/US2016/049896, "Application Serial No. PCT/US2016/049896, International Search Report and the Written Opinion dated May 19, 2017", 14 pages.

PCT/US2016/049896, "International Application Serial No. PCT/US2016/049896, International Preliminary Report on Patentability dated Jan. 17, 2019", ASAPP, Inc., 9 pages.

PCT/US2017/040205, "Application Serial No. PCT/US2017/040205, International Search Report and the Written Opinion dated Sep. 15, 2017", 11 pages.

PCT/US2017/040205, "International Application Serial No. PCT/US2017/040205, International Preliminary Report on Patentability dated Jan. 17, 2019", ASAPP, Inc., 9 pages.

PCT/US2018/064404, "International Application Serial No. PCT/US2018/064404, International Search Report and Written Opinion dated Feb. 25, 2019", ASAPP, Inc., 9 pages.

PCT/US2019/014569, "International Application Serial No. PCT/US2019/014569, International Search Report and Written Opinion dated Mar. 4, 2019", ASAPP, Inc., 13 pages.

Pennington, Jeffrey et al., "GloVe: Global Vectors forWord Representation", Empirical Methods in Natural Language Processing (EMNLP), http://www.aclweb.org/anthology/D14-1162, (accessed on Nov. 26, 2018 from https://nlp.stanford.edu/pubs/glove.pdf), 2014, pp. 1532-1543.

Rush, Alexander M. et al., "Optimal Beam Search for Machine Translation", Proceedings of EMNLP 2013, Oct. 18-21, 2013, Seattle, Washington, USA, 2013, 12 pages.

Scott, Tyler R. et al., "Adapted Deep Embeddings: A Synthesis of Methods for k-Shot Inductive Transfer Learning", arXiv:1805.08402v4 [cs.LG], https://arxiv.org/pdf/1805.08402.pdf, Oct. 27, 2018, 12 pages.

See, Abigail et al., "Get to the Point: Summarization with Pointer-Generator Networks", CoRR abs/1704.04368, http://arxiv.org/abs/1704.04368, Apr. 25, 2017, 20 pages.

Shen, Tianxiao et al., "Style Transfer from Non-Parallel Text by Cross-Alignment", CoRR abs/1705.09655, http://arxiv.org/abs/1705.09655, Nov. 6, 2017, 12 pages.

Shi, Yangyang et al., "Contextual spoken language understanding using recurrent neural networks.", 2015 IEEE International Conference on Acoustics, Speech and Signal Processing (ICASSP). IEEE, 2015, pp. 5271-5275.

(56) References Cited

OTHER PUBLICATIONS

Snell, Jake et al., "Prototypical Networks for Few-shot Learning", arXiv:1703.05175v2 [cs.LG], https://arxiv.org/pdf/1703.05175.pdf, Jun. 19, 2017, 13 pages.

Sutskever, Ilya et al., "Sequence to Sequence Learning with Neural Networks", CoRR abs/1409.3215, http://arxiv.org/abs/1409.3215, 2014, 9 pages.

Tai, Kai S. et al., "Improved Semantic Representations From Tree-Structured Long Short-Term Memory Networks", CoRR, accessed at https://arxiv.org/pdf/1503.00075v3.pdf, 2015 (accessed on Jan. 3, 2017), 11 pages.

Ustinova, Evgeniya et al., "Learning Deep Embeddings with Histogram Loss", arXiv:1611.00822v1 [cs.CV], https://arxiv.org/pdf/1611.00822.pdf, Nov. 2, 2016, 9 pages.

Vincent, Pascal et al., "Extracting and Composing Robust Features with Denoising Autoencoders", Proceedings of the 25th International Conference on Machine Learning, Helsinki, Finland, http://www.cs.toronto.eduh/~larocheh/publications/icml-2008-denoising-autoencoders.pdf (accessed on Nov. 26, 2018), 2008, 8 pages.

Vincent, Pascal et al., "Stacked Denoising Autoencoders: Learning Useful Representations in a Deep Network with a Local Denoising Criterion", Journal of Machine Learning Research 11, http://www.jmlr.org/papers/volume11/vincent10a/vincent10a.pdf, published Dec. 2010, pp. 3371-3408.

Vinyals, Oriol et al., "A Neural Conversational Model", CoRR abs/1506.05869, http://arxiv.org/abs/1506.05869, 2015, 8 pages.

Wang, Sida et al., "Baselines and Bigrams: Simple, Good Sentiment and Topic Classification", Proceedings of the 50th Annual Meeting of the Association for Computational Linguistics, Jeju, Republic of Korea, https://www.aclweb.org/anthology/P12-2018, Jul. 8-14, 2012, pp. 90-94.

Xiao, Yijun et al., "Efficient Character-level Document Classification by Combining Convolution and Recurrent Layers", CoRR abs/1602.00367, https://arxiv.org/pdf/1602.00367.pdf, Feb. 1, 2016, 10 pages.

Yu, Mo et al., "Diverse Few-Shot Text Classification with Multiple Metrics", Proceedings of the 2018 Conference of the North American Chapter of the Association for Computational Linguistics: Human Language Technologies, vol. 1 (Long Papers), New Orleans, Louisiana, https://www.aclweb.org/anthology/N18-1109, Jun. 2018, pp. 1206-1215.

Zhang, Xiang et al., "Character-level Convolutional Networks for Text Classification", CoRR abs/1509.01626, http://arxiv.org/abs/1509.01626, 2015, 9 pages.

Zhao, Han et al., "Self-Adaptive Hierarchical Sentence Model", CoRR abs/1504.05070, http://arxiv.org/abs/1504.05070, Apr. 27, 2015, 8 pages.

U.S. Appl. No. 16/054,473, filed Aug. 3, 2018, Pending, Lisa Lijia Jiang.

* cited by examiner

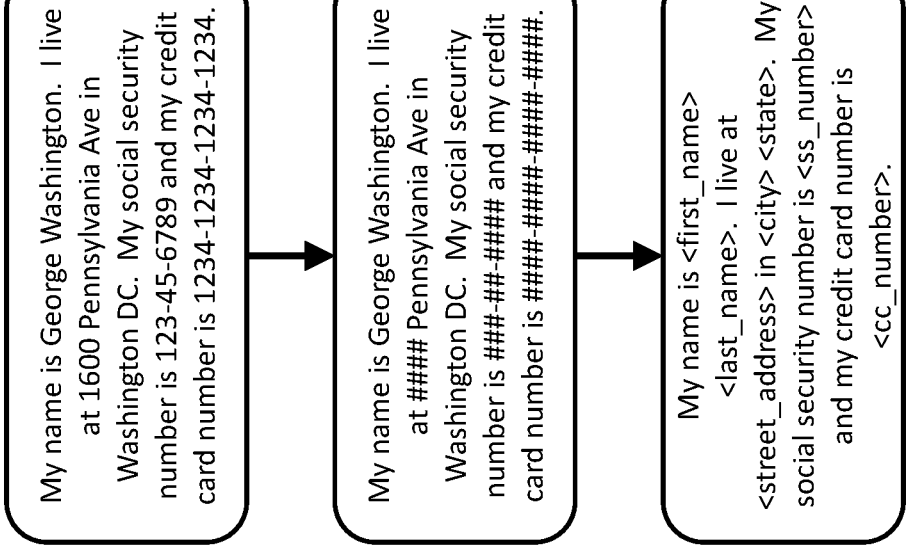

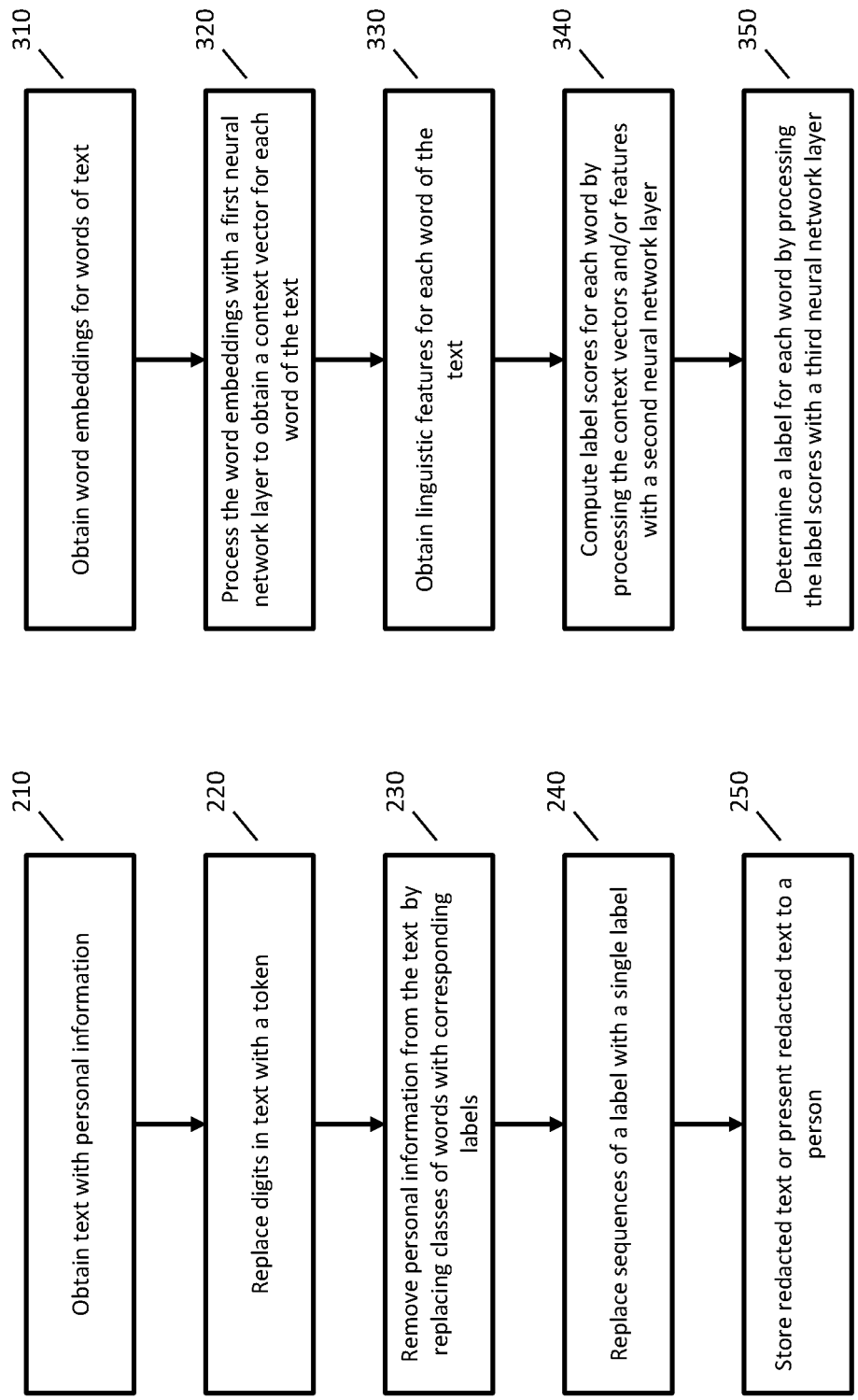

REMOVING PERSONAL INFORMATION FROM TEXT USING A NEURAL NETWORK

CLAIM OF PRIORITY

The present application is a continuation of U.S. patent application Ser. No. 15/964,629, filed on 27 Apr. 2018, and titled "REMOVING PERSONAL INFORMATION FROM TEXT USING A NEURAL NETWORK." The Ser. No. 15/964,629 application is incorporated herein by reference in its entirety for all purposes.

FIELD OF THE INVENTION

The present invention relates to using a neural network to process text to remove personal information from the text.

BACKGROUND

In a variety of situations, stored text may include personal information. Personal information can vary from relatively low-sensitive information, such as a person's name, to highly sensitive information, such as a social security number or a credit card number. An entity that stores text may desire to remove at least some personal information from the stored text, for example for privacy or liability concerns.

Personal information may be expressed in text in a variety of ways, and many conventional techniques, such as simple rule based approaches or regular expressions, may not provide sufficient accuracy in identifying different types of personal information. Additionally, removing personal information from text may limit the usefulness of the text for later applications, such as classifying the text.

Presently known systems to identify and protect personal information suffer from a number of drawbacks. For example, multiple regulatory schemes exist that may include different definitions of personal information may protect differentiated privacy concerns and therefore protect different aspects of personal information. Further, even unintentional releases of personal information can result in significant liability, reputational impact to the host of the information, and even criminal liability in certain circumstances. The required protections for data that includes personal information may be expensive and cumbersome to implement, and accordingly where grey information is produced, for example that may include personal information but the host is not certain, expensive processes to protect the information may be over-inclusive resulting in costs that are not necessary. Additionally, where personal information is included within other information where it is not expected, for example where a customer, patient, or other entity provides information in an unexpected manner, the overall information may not be sufficiently protected because the host of the information did not recognize or expect that personal information would be included within the information. Additionally, privacy policies of an entity (e.g., a hospital, a social media website, and/or a customer service provider) may exceed or otherwise vary from regulatory schemes, resulting in further complexity in identifying personal or other sensitive information.

Additionally, it may be desirable to share some of the information related to the personal information, such as for studies, data mining, law enforcement requests, development of efficient processes, or other purposes, but it may also be required to keep data including personal information for other purposes. Presently known systems may require that either the full information be shared, with consequent risks and expense related to managing the sharing of the full information, or that the data set be overly redacted reducing the utility of the information. Presently known systems may also not adapt to multiple personal information schemes, where configured data sets can be rapidly prepared with high confidence for sharing in multiple jurisdictions and/or for multiple purposes, each of which may have a distinct set of determinations for which aspects of the data include personal or other sensitive information.

An entity that stores text may desire techniques for accurately identifying and removing personal information from text in a manner that maintains the usefulness of the modified text in later applications, and/or that can be configured for multiple purposes.

BRIEF DESCRIPTION OF THE FIGURES

The invention and the following detailed description of certain embodiments thereof may be understood by reference to the following figures:

FIGS. 1A and 1B illustrate two techniques for redacting text.

FIG. 2 is a flowchart of an example implementation of redacting text by removing personal information.

FIG. 3 is a flowchart of an example implementation of determining labels corresponding to words of text.

DETAILED DESCRIPTION

Figure 4:
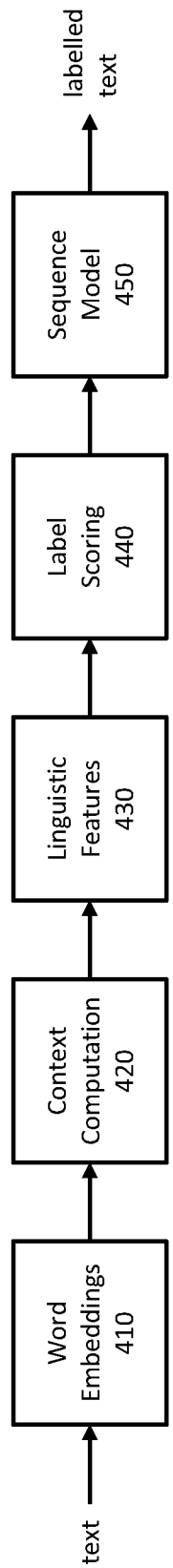
FIG. 4 is an exemplary system for processing text to determine labels for words of the text.

Described herein are techniques to remove personal information from text and to replace the words of the personal information with an indicator, such as a label, that indicates a type or class of the personal information that was removed. As used herein, personal information includes any information that an entity may desire to remove from text. Personal information need not relate to a human person, and may include information relating to a legal entity (e.g., a company or an estate), a transaction (e.g., a settlement amount, a bid, or a proposal), confidential or proprietary information, business information (e.g., a planned merger or acquisition, a regulatory filing, a drug filing, or other business information that should not be shared for regulatory, insider information, or proprietary reasons), or any other information for which it may be desired to prevent people from obtaining access to the information. Personal information may include, but is not limited to, personally identifiable information (PII). In certain implementations, personal information includes any information that has been deemed to have a privacy interest or other protectable interest in any jurisdiction, and/or in any jurisdiction of interest. In certain implementations, personal information includes any information that is protectable for any business, regulatory, policy, or other reason, and may include, without limitation, information that identifies, tends to identify (e.g., narrows indicated persons down to a smaller identifiable group), or that can be used to identify (e.g., alone or as combined with other related information), a person or entity. In certain implementations, information may be personal information in one context but not in another context—for example where the information can identify a person or entity when combined with or related to other types of information, but not when presented alone. Text that has been processed to remove personal information may be referred to as redacted text.

Personal information may be expressed in text in a variety of manners. For example, a person's street address may be expressed as "1600 Pennsylvania Avenue" or may be expressed as "The house with number sixteen hundred on the avenue of Pennsylvania." Because of the variety of ways in which personal information may be expressed, some conventional techniques may be limited in their ability to identify different manners of expressing personal information. The techniques described herein use a neural network to identify personal information, and a neural network may be trained with sufficient training data so that it may be able to identify different manners of expressing personal information.

When removing personal information from text, the information may be removed or replaced with other words or characters. For example, a social security number may be replaced with one or more "X" characters. When performing a simple removal or replacement of personal information, there may be ambiguity in the kind of information that was removed from the text. For example, where the redacted text is "You may contact me at XXXX", it is not known if the removed information was an email address, a phone number, or an email address. Accordingly, when removing personal information from text, it may be desired to replace the personal information with a label that indicates a type or class of personal information that was removed. For the above example, the redacted text may instead be stored as "You may contact me at <phone_number>". In certain implementations, a label may additionally or alternatively include a reason that the information is redacted, such as a general category (e.g., medical, PII, business transaction, confidential information, etc.), a source category (e.g., PII regulations, company privacy policy, medical information, insider information, proprietary information), and/or a source entity or law (e.g., ACME company, SEC, HIPAA, Data Protection Directive, etc.). The inclusion of a reason that the information is redacted is optional and non-limiting, and provides additional information both for using the redacted text in multiple contexts, as well as additional training information for the neural network. In certain implementations, multiple redacted text data may be generated for separate reasons from the text, with or without redacted text including a reason the information is redacted. In certain implementations, reasons for redacting text may be stored as metadata that is not visible and/or not accessible to one or more end users of the redacted text.

FIG. 1A illustrates an example of removing personal information from text to obtain redacted text. In FIG. 1A, the original text includes a first name, a last name, a street address, a city, a social security number, and a credit card number. Each of these items of personal information have been replaced with a label that indicates the type of personal information that was removed. Any appropriate format may be used for a label, and the labels are not limited to the format in this example. In the example of FIG. 1A, original text is depicted at the top, with a transition arrow depicting the creation of the redacted text below. The aspects of the original text that are redacted in the example of FIG. 1A are a non-limiting example. For example, redacted text may be created that leaves certain aspects of personal information in place, while removing other aspects of personal information, to reduce the risks and costs of storing redacted text that includes some aspects of personal information without having more personal information than is necessary. In a further example, redacted text for storage in a medical file may include certain aspects of personal information (e.g., a name and address) and remove other unnecessary aspects of personal information (e.g., a credit card number).

One of skill in the art, having the benefit of the disclosure herein and information ordinarily available when contemplating a system for removing personal information from text, can readily determine which personal information is to be redacted from the original text, and which personal information may remain in the original text. Certain considerations for determining what constitutes personal information, which personal information may be redacted, and which personal information may remain after redaction include, without limitation: the type of information in the original text; the location, access, security protocols, and relevant retention policy of the stored redacted text; the target audience for the redacted text; the reason for the creation of the redacted text; the relevant regulations, policies, and confidentiality requirements relating to the original text and the redacted text; and/or the geographical location of the original text, the intake of the original text, the redacted text, the communication of the redacted text, and any stored or communicated versions of data related thereto.

FIG. 1B illustrates an example two-step process for removing personal information from text. In FIG. 1B the process of removing personal information includes a first step (e.g., a substitution operation) that performs initial processing to replace each digit of the text with the token "#" (or any other appropriate token, character, or placeholder) that indicates that a digit was previously present. Because such processing may not require significant computational resources, it may performed in a larger number of scenarios than other steps that may require greater computational resources. For example, the first step may be performed on a phone. Other similar types of processing may be performed at the first step, such as replacing written numbers (e.g., "three") with the same or a different token. Thus, in the example, the replacement of data with tokens may be a simple replacement of any data with a token, and/or may be a replacement of data with an informed token such as a selected token indicating the type of information replaced. In certain implementations, a token may be encoded in a data structure indicating the replacement made that is distinct from that depicted, such as <5 #>, for example, indicating that five characters or digits have been replaced with the token(s). Any operations to replace data with tokens or placeholders are contemplated herein.

In the example of FIG. 1B, the upper text description is the original text, and the lower text description is the redacted text after both operations of the process of FIG. 1B are performed. The middle text description is referenced as an example of "partially redacted text" herein, and represents the example text after the first step of the example process in FIG. 1B is performed. In certain implementations, although the middle text description is referenced as partially redacted text, the redacted text resulting from the second step of the example process in FIG. 1B may nevertheless be identical to the partially redacted text, in that the characters present in the text after redaction and partial redaction may be identical—for example where the only personal information to be redacted includes numbers or other aspects of the original text that are substituted in the first step, and/or where labels such as those depicted in the example of FIG. 1B are not included in the redacted text.

In certain implementations, more than one version of partially redacted text may be produced, for example to provide a first version to certain users of the system, and a second version to other users of the system. For example, a first user of the system may be a finance based user, where information that appears to be financially related such as credit card information, is not substituted for the first user. A second user of the system may be an administrator that inputs customer information such as a name, address, phone number, etc., where financial information may be substituted for the second user. In certain implementations, partially redacted text and original text may both be stored—for example where substitution removes necessary information, a user may be able to request or access aspects of the original text, and which access may further be subject to logging, auditing, or other protective measures to ensure tracking, accountability, avoid unintentional access, or the like.

In the second step (e.g., a full redaction operation) of the example in FIG. 1B, the remaining personal information is replaced with labels in a similar manner as in FIG. 1A. This two-step process may have advantages over the one-step process in that highly sensitive information, such as social security numbers or credit card numbers, may be immediately removed to protect that information before the second step is performed. In certain implementations, the first step of the example in FIG. 1B can be performed more rapidly, and/or with lower capability hardware (e.g., on a mobile phone, terminal, laptop, or other device having reduced processing power) than the second step of the example. In certain implementations, the two-step process can additionally reduce the number of users or operators within the process flow that access or that can access the original text. In certain implementations, the first step of the example in FIG. 1B can be performed before a device displays the original text to a user—for example where a customer service representative receives the partially redacted text rather than the original text as a message from a customer engaging a customer service system.

In certain implementations, the first step and the second step of the FIG. 1B are performed serially—for example the original text is processed by a first device (e.g., a receiving device, mobile phone, or the like) for the operations of the first step, and the partially redacted text is passed to a second device (e.g., a server, a cloud-based device, a computing cluster, or the like) for the operations of the second step. The description herein with a first device performing the first step and a second device performing the second step is for clarity of description, although any devices may perform each step, including the same device sequentially performing the first step and the second step, and/or a distributed number of devices performing one or more of the first step and the second step.

In certain implementations, the first step and the second step of the example in FIG. 1B are performed in parallel—for example the original text is processed by a first device to perform the first step, and the original text is additionally processed by a second device to perform the second step. For example, in certain implementations, full redaction operations of the second step in the example of FIG. 1B may be more capable or yield better results if the original text rather than the partially redacted text is utilized in the second step. The description herein of a parallel operation of the first step and second step is solely to depict the logical data flow of the original text and the partially redacted text—for example operations of the second step may be completed before, during, or after the operations of the first step in a parallel arrangement. Additionally or alternatively, operations of the second step may be performed on groups of text data, batches of text data, or sequenced individual text data elements, organized in the same manner, or in a distinct manner, from any groups of text data, batches of text data, or sequenced individual text data elements utilized for the first step. It is specifically contemplated that, in certain implementations, the first step and the second step are performed serially, and in certain additional or alternative implementations, the first step and the second step are performed in parallel.

FIG. 2 is a flowchart of an example implementation of removing personal information from text. In FIG. 2 and other flowcharts herein, the ordering of the steps is exemplary and other orders are possible, not all steps are required, steps may be combined (in whole or part) or sub-divided, and, in some implementations, some steps may be omitted or other steps may be added. In certain implementations, some steps may be performed iteratively in whole or part, and/or parallel operations of one or more steps or portions thereof may be performed. The methods described by any flowcharts herein may be implemented, for example, by any of the computers or systems described herein.

At step 210, text is obtained that may include personal information, and/or that is to be checked for personal information. The text may be obtained in any appropriate way, and the techniques described herein are not limited to any particular manners of receiving text or any particular applications of receiving or processing text.

In some implementations, text may be obtained by a company from a customer who is seeking customer support from the company (e.g., a customer support request). A customer may use any appropriate device, such as a smart phone, tablet, wearable device, or Internet of things device to transmit information. The customer may request support using any appropriate techniques, such as typing or speaking a message to an app running on the customer device (e.g., an app of the company or a third-party app created for processing customer requests), typing or speaking a message on a web page, sending a text message, or sending an email. As used herein, a text message includes any message sent as text including but not limited to a message sent using SMS (short message service) or a special-purpose application (e.g., Facebook messenger, Apple iMessage, Google Hangouts, or WhatsApp). Received speech may be converted to text using automatic speech recognition. Without limitation, text may be obtained from form data, submitted documents and/or generated documents in any manner.

At step 220, portions of the text may be replaced with other tokens or characters to remove some personal information. For example, digits may be replaced with the character or token "#". Any other appropriate replacements may be performed as well, such as replacing written numbers or other sensitive information with other characters or tokens. Step 220 may be performed using any appropriate techniques, such as using a rule-based approach or regular expressions. Step 220 is optional and is not performed in some implementations. In certain implementations, step 220 produces partially redacted text. In certain implementations, step 220 may produce more than one version of partially redacted text, for example to support multiple users and/or uses of the partially redacted text.

At step 230, redacted text is generated by replacing classes of words with a corresponding label, such as the replacements shown in FIGS. 1A and 1B. Step 230 may be performed using a neural network as described in greater detail below. In certain implementations, step 230 may operate on the partially redacted text, and/or on the original text. In certain implementations, step 230 may produce more than one version of the redacted text, for example to support multiple redaction purposes, personal information regimes, to provide data redacted for different reasons to be shared to different users of the data, or the like.

At step 240, sequences of a label may be replaced with a single instance of that label. For example, where the text includes "I live at 1600 Pennsylvania Avenue", the processing of step 230 may replace each word of the street address with a label indicating that the removed word corresponds to a street address. The text after step 230 may thus be "I live at <street_address> <street_address> <street_address>". The processing of step 240 may replace the three identical labels with a single instance of the label, and the text after step 240 may thus be "I live at <street_address>". Step 240 is optional and is not performed in some implementations. In certain implementations, step 240 is performed for certain types of data and/or for certain labels, and not performed for other types of data and/or other labels.

At step 250, the redacted text resulting from the previous steps may be further processed. For example, the redacted text may be stored on a data store, may be presented to a person (e.g., a customer service representative), or processed in some other manner, such as processing the redacted text with a classifier to determine information about the redacted text. In certain implementations, original text, one or more versions of partially redacted text, and/or one or more versions of the redacted text, may be stored and/or communicated at step 250. For example, original text may be stored in a first location (e.g., on a secure server) and redacted text stored in a second location (e.g., on a server associated with a customer of the redacted text data). In certain implementations, associations between the stored original text and redacted versions may be preserved or removed, such that the redacted versions may selectively be associated with the stored original text or not, according to the desired configuration of a system utilizing the example implementation of FIG. 2.

FIG. 3 is a flowchart of an example implementation of using a neural network to determine labels for words of text. For example, the processing of FIG. 3 may be performed at step 230 of FIG. 2. As described above, operations of the processing of FIG. 3 may be performed on original text, partially redacted text, and/or one or more versions of these.

At step 310, a word embedding is obtained for each word of the text. A word embedding is a vector in an N-dimensional vector space that represents the word but does so in a manner that preserves useful information about the meaning of the word. For example, the word embeddings of words may be constructed so that words with similar meanings or categories may be close to one another in the N-dimensional vector space. For example, the word embeddings for "cat" and "cats" may be close to each other because they have similar meanings, and the words "cat" and "dog" may be close to each other because they both relate to pets. Word embeddings may be trained in advance using a training corpus, and when obtaining the word embeddings at step 310, a lookup may be performed to obtain a word embedding for each word of the text.

Any appropriate techniques may be used to compute word embeddings from a training corpus. For example, the words of the training corpus may be converted to one-hot vectors where the one-hot vectors are the length of the vocabulary and the vectors are 1 in an element corresponding to the word and 0 for other elements. The one-hot vectors may then be processed using any appropriate techniques, such as the techniques implemented in Word2Vec or GloVe software. A word embedding may accordingly be created for each word in the vocabulary. An additional embedding may also be added to represent out-of-vocabulary (OOV) words.

In some implementations, word embeddings that include information about the characters in the words may be used. For example, where a word is misspelled, the misspelled word may not appear in the vocabulary, and thus the word is an OOV word and the word embedding for an OOV word would be used. A word embedding that includes information about the characters of the word may be referred to as a word-character embedding.

To obtain a word-character embedding of a word, a first embedding may be obtained that corresponds to words of the vocabulary (e.g., as described above). A second embedding may be obtained by processing characters of the word. For example, a character embedding may be obtained for each character of the word (where a character embedding represents the character in an N-dimensional vector space), and the second embedding may be obtained by processing the character embeddings with a convolutional neural network. The word embedding may then be obtained by combining the first embedding and the second embedding, such as by concatenating them together. A word embedding may be computed using any of a word, character, or word-character embeddings, for example and without limitation as described herein in the portion referencing FIG. 10.

Figure 10:
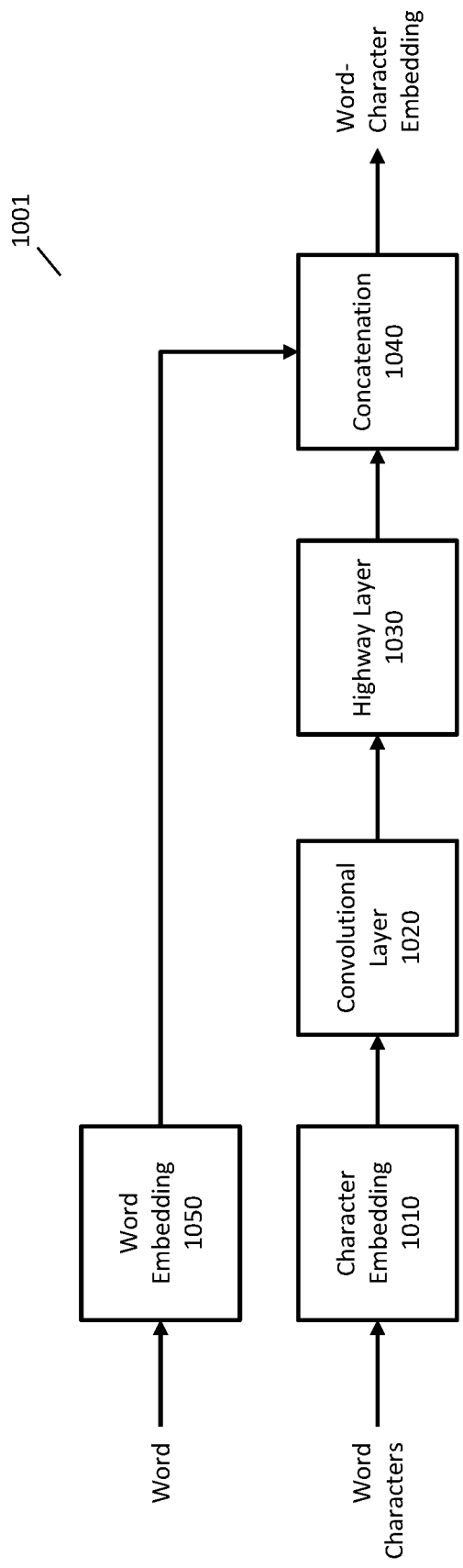
FIG. 10 is a schematic block diagram of an example system to modify word embedding.

Referencing FIG. 10, an example system 1001 to modify a word embedding to include information about characters in the word, and/or to generate a word-character embedding is described herein. Any operations to create a word, character, or word-character embedding is contemplated herein, including without limitation any operations described in U.S. patent application Ser. No. 15/863,225, filed on 5 Jan. 2018, which is hereby incorporated by reference in its entirety. Any other apparatus and/or operation to create a word embedding, character embedding, and/or word-character embedding may be used in addition to or as an alternative to the operations of system 1001.

FIG. 10. illustrates an example of a system 1001 that modifies a word embedding to include information about characters in the word, and the modified word embeddings are referenced in the example as word-character embeddings. The word-character embeddings generated by system 1001 may be used in place of word embeddings for any of the techniques described throughout the present disclosure.

In FIG. 10, word embedding component 1050 may process a word of the text and output a word embedding. The word embedding may be computed using any appropriate techniques, such as any of the techniques described above.

In FIG. 10, character embedding component 1010 may sequentially process the characters of the word and output a character embedding for each character. Similar to a word embedding, a character embedding represents a character in an N-dimensional vector space. The size of the vector space for a character embedding may be significantly smaller than the size of the vector space for a word embedding since the number of characters (e.g., in a "character vocabulary") will typically be much less than the number of words (e.g., in the vocabulary and/or a "word vocabulary"). The character embeddings may be computed using any appropriate techniques, such as any of the techniques described above for the word embeddings. In some implementations, one-hot vectors for the characters may be used in place of character embeddings.

The word embeddings and character embeddings may be computed in advance and word embedding component 1050 and character embedding component 1010 may perform a lookup for each received word and character to obtain the corresponding embedding.

A word-character embedding may be computed using the word embedding of the word and the character embeddings for each character of the word. Any appropriate techniques may be used to create a word-character embedding from the individual embeddings. For example, a word-character embedding may be created by concatenating the word embedding with each of the character embeddings. In some implementations, other techniques may be used, such as the techniques depicted in and described in relation to FIG. 10.

In FIG. 10, convolutional layer component 1020 may receive a representation of characters of the word, such as character embeddings, and process them to generate a feature vector that represents the sequence of characters. The feature vector may capture information about relationships between adjacent characters or characters that are close to each other as determined by a filter of the convolutional layer. Convolutional layer component 1020 may implement any appropriate convolutional neural network.

In some implementations, convolutional layer component 1020 may perform a sequence of three operations: (i) filtering, (ii) non-linear activation, and (iii) max-pooling. To perform filtering, the character embeddings may be stacked to create a matrix where the size of the matrix is the number of characters by the length of the character embeddings. A two-dimensional filter is then applied to this matrix by performing a convolution of the matrix and the filter. The filter may have a short length in one or both directions to capture short-term information, such as relationships between adjacent characters or characters that are close to each other. The output of this step is a matrix that is referred to as filtered character embeddings. To perform non-linear activation, a function of the elements of the filtered character embeddings is computed, such as a tanh function or a rectified linear unit. The output is referred to as activated filtered character embeddings. To perform max-pooling, a maximum value is selected across the columns of the activated filtered character embeddings. The output of the max-pooling step is referred to as a feature vector that represents the characters in the word.

In some implementations, system 1001 may include multiple convolutional layer components where each convolutional layer component processes the sequence of character embeddings using a different filter (such as a different filter width) and outputs a feature vector corresponding to the filter width. Where multiple convolutional layers are included, the feature vectors from the convolutional layers may be combined or concatenated to generate a combined feature vector that is used in the next stage of processing.

Highway layer component 1030 may process the feature vector generated by convolutional layer 1020 (or from multiple convolutional layers) and output a modified feature vector. Highway layer component 1030 may implement any appropriate techniques for a highway layer, such as $$z = g \odot \sigma_h(W_h y + b_h) + (1-g) \odot y$$

$$g = \sigma_g(W_g y + b_g)$$

where y is the feature vector computed by convolutional layer 1020; z is the modified feature vector computed by highway layer 1030; $\sigma_h$ and $\sigma_g$ are non-linearities; $W_h$, $W_g$, $b_h$, and $b_g$ are matrices or vectors of parameters; $\odot$ is an element-wise product; g may be referred to as a transform gate of the highway later; and 1−g may be referred to as the carry gate of the highway layer. The highway layer allows for further processing of the feature vector (such as with a multi-layer perceptron) but outputs a combination of the processed feature vector and the unprocessed feature vector to allow increased flow of information about the output of the convolutional layer in the final output.

Concatenation component 1040 may receive a character feature vector, such as the modified feature vector from highway layer component 1030, and the word embedding from word embedding component 1050, and combine or concatenate them together to generate a word-character embedding that may be used in place of the word embedding described above.

In some implementations, highway layer 1030 may not be used and concatenation component 1040 may instead combine the feature vector computed by convolutional layer 1020 with the word embedding. In some implementations, highway layer component 1030 may be replaced by another layer, such as a multilayer perceptron, and/or multiple highway layers may be used. In some implementations, one or both of convolutional layer component 1020 and highway layer component 1030 may be replaced by a different neural network, such as a recurrent neural network. In some instances, the word whose characters are being processed may be an OOV word and the word embedding may correspond to a special token indicating an OOV word.

Accordingly, a word-character embedding may be created for each word of the processed text using any of the techniques described above. Because a word-character embedding includes information about both words and characters, it may allow models and classifiers to provide improved performance over models and classifiers that use only word embeddings. For example, for a misspelled word, a model or classifier may be able to determine useful information about the misspelled word using the characters and context of the misspelled word.

In some implementations, the word-character embeddings may be used as a preprocessing step. For each word of the processed text that is an OOV word, the word-character embedding of the OOV word may be compared with the word-character embeddings of words in the vocabulary to replace the OOV word with a word from the vocabulary that best matches the OOV word.

Referring back to FIG. 3, at step 320, the word embeddings are processed with a first neural network layer to obtain a context vector for each word of the text. A context vector for a word may be any vector that represents information about the contexts in which the word is likely to appear, such as information about words that are likely to come before or after the word. The context vector may not be understandable by a person and may be meaningful with respect to the parameters of the neural network.

Any appropriate techniques may be used for the first neural network layer. For example, the first layer may be a recurrent neural network layer, a bidirectional recurrent neural network layer, a convolutional layer, or a layer with long short-term memory (an LSTM layer).

In some implementations, the context vector may be computed using a forward LSTM layer and a backward LSTM layer. A forward LSTM layer may be computed with the following sequence of computations for t from 1 to N (where N is the number of words in the text):

$$i_t = \sigma(U_i x_t + V_i h_{t-1}^f + b_i)$$

$$f_t = \sigma(U_f x_t + V_f h_{t-1}^f + b_f)$$

$$o_t = \sigma(U_o x_t + V_o h_{t-1}^f + b_o)$$

$$g_t = \tanh(U_g x_t + V_g h_{t-1}^f + b_g)$$

$$c_t = f_t \odot c_{t-1} + i_t \odot g_t$$

$$h_t^f = o_t \odot \tanh(c_t)$$

where $x_t$ represent the word embeddings from step 310, the U's and V's are matrices of parameters, the b's are vectors of parameters, $\sigma$ is a logistic sigmoid function, and $\odot$ denotes element-wise multiplication. The sequence of computations may be initialized with $h_o^f$ and $c_o$ as zero vectors. The hidden state vector $h_t^f$ may represent the context of the $t^{th}$ word going in the forward direction and indicate the context of the $t^{th}$ word with regards to words that come before it.

At each iteration of the above processing, a hidden state vector $h_t^f$ is computed that corresponds to the word represented by word embedding $x_t$. The vector $h_t^f$ may be used to compute the context vector as described in greater detail below.

A backward LSTM layer may be computed with the following sequence of computations for t from N to 1 (i.e., the words may be processed in reverse):

$$i_t = \sigma(\hat{U}_i x_t + \hat{V}_i h_{t+1}^b + \hat{b}_i)$$

$$f_t = \sigma(\hat{U}_f x_t + \hat{V}_f h_{t+1}^b + \hat{b}_f)$$

$$o_t = \sigma(\hat{U}_o x_t + \hat{V}_o h_{t+1}^b + \hat{b}_o)$$

$$g_t = \tanh(\hat{U}_g x_t + \hat{V}_g h_{t+1}^f + \hat{b}_g)$$

$$c_t = f_t \odot c_{t+1} + i_t \odot g_t$$

$$h_t^b = o_t \odot \tanh(c_t)$$

where $x_t$ represent the word embeddings from step 310, the $\hat{U}$'s and $\hat{V}$'s are matrices of parameters, the $\hat{b}$'s are vectors of parameters, and $\sigma$ and $\odot$ are the same as above. The sequence of computations may be initialized with $h_{N+1}^f$ and $c_{N+1}$ as zero vectors. The hidden state vector $h_t^b$ may represent the context of the $t^{th}$ word going in the backward direction and indicate the context of the $t^{th}$ word with regards to words that come after it.

The context vectors for the words may be obtained from the hidden state vectors $h_t^f$ and $h_t^b$. For example, the context vector for the $t^{th}$ word may be the concatenation of $h_t^f$ and $h_t^b$ and may be represented as $h_t$.

At step 330, linguistic features may be obtained for each word of the text. Linguistic features for a word may include any features that relate to the phonology, morphology, syntax, or semantics of a word. Any appropriate linguistic features may be used, such as the following:
  whether the word starts with a capital letter;
  whether the word consists of all capital letters;
  whether the word has all lower case letters;
  whether the word has non-initial capital letters;
  whether the word contains digits;
  whether the word contains punctuation;
  prefixes and suffixes of the word;
  whether the word has an apostrophe near the end;
  the word's part of speech (POS) label (encoded as a 1-of-k vector); or
  the word's chunk label (encoded as a 1-of-k vector).

The context vector for a word and the linguistic features for a word may be combined to create a feature vector for the word, which may be denoted as $f_t$. Any appropriate techniques may be used to combine the context vector and the linguistic features, such as concatenation. In some implementations, step 330 is optional and the feature vector for a word may be the same as the context vector for the word.

At step 340, a vector of label scores is computed for each word. Each element of the vector of label scores may be a score that corresponds to a label, such as any of the labels described above, and indicate a match between the word and the class of words corresponding to the label. The vector of label scores may also include an element that indicates that the word doesn't correspond to any of the labels.

The label scores may be computed using any appropriate techniques. In some implementations, the label scores may be computed using a second layer of a neural network. Any appropriate neural network layer may be used, such as a multi-layer perceptron. In some implementations, the label scores may be computed as $$y_t = W_s f_t + b_s$$

or $$y_t = \sigma(W_s f_t + b_s)$$

where $f_t$ is the feature vector of the $t^{th}$ word as computed above, $W_s$ is a matrix of parameters, $b_s$ is a vector of parameters, and $\sigma$ is a nonlinearity.

At step 350, a label is determined for each word by processing the label scores for the words. The best matching label for a word may depend on nearby labels. For example, where a word corresponds to a <street_address> label, it may be more likely that a subsequent word corresponds to the <city> label or the <state> label. Accordingly, processing the sequence of label scores may result in more accurate labels.

A sequence model may be used to process the label scores to determine a label for each word. A sequence model is any model that determines a label for word using information about the word in a sequence of words, such as using the label scores for one or more previous or subsequent words. Any appropriate sequence model may be used, such as a conditional random field (CRF), a higher-order CRF, a semi-Markov CRF, a latent dynamical CRF, a discriminative probabilistic latent variable model, a Markov random field, a hidden Markov model, or a maximum entropy Markov model.

In some implementations, a sequence model may be implemented with a CRF by maximizing a score across all possible sequences of labels:

$$s(y_1, \ldots, y_N; l_1, \ldots, l_N) = A_{l_N, l_{N+1}} + \sum_{t=1}^{N} A_{l_{t-1}, l_t} + y_{t, l_t}$$

where $A_{l_1, l_2}$ is a transition probability for transitioning from a word with label $l_1$ to a subsequent work with label $l_2$, the value $y_{t, l_1}$ is the label score indicating a match between the $t^{th}$ word and label $l_1$, and s indicates a score for the sequence of labels $l_1, \ldots, l_N$.

Any appropriate techniques may be used to find a sequence of labels that produces a highest score given the label scores for the words. In some implementations, a dynamic programming algorithm, such as a beam search or the Viterbi algorithm may be used.

After step 350, a label is determined for each word. These labels may then be used in the process of FIG. 2, such as to replace one or more words with the label for the word to remove personal information from the text.

FIG. 4 is an exemplary system for determining labels for words of text. In FIG. 4, word embedding component 410 may receive text as input and obtain a word embedding for each word of the text, such as any of the word embeddings described herein. Context computation component 420 may process the word embeddings and compute a context vector for each word of the text. In some implementations, context computation component 420 may compute the context vectors with a first layer of a neural network, such as an LSTM layer. Linguistic features component 430 may obtain linguistic features for each word of the message, such as any of the linguistic features described herein. Label scoring component 440 may compute label scores for each word of the text where the label scores for a word indicate a match between the word and corresponding labels. In some implementations, label scoring component 440 may compute the label scores with a second layer of a neural network, such as a multi-layer perceptron. Sequence model component 450 may process the label scores to determine a label for each word of the text. In some implementations, sequence model component 450 may determine the labels with a third layer of a neural network, such as a conditional random field layer. The output of sequence model component 450 corresponds to labelled text that may be used to redact personal information from the text.

Figure 5:
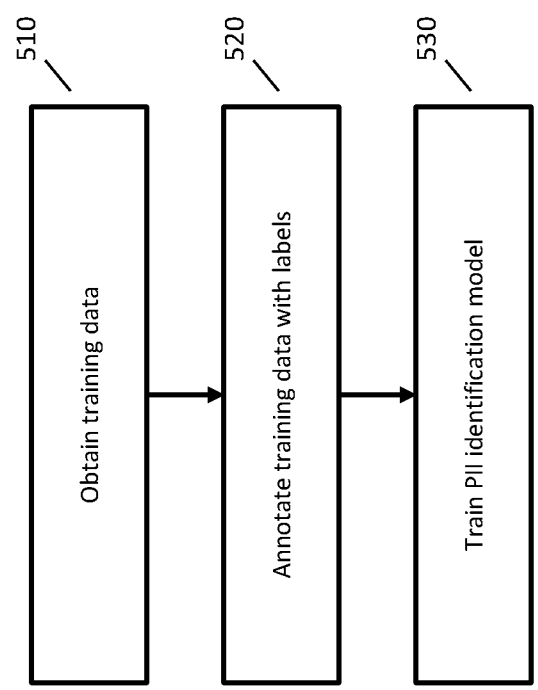
FIG. 5 is a flowchart of an example implementation of training a model for labelling words of text.

FIG. 5 is a flowchart of an example implementation of training a mathematical model, such as a neural network, for labelling words of personal information in text.

At step 510, a corpus of training data is obtained. The training data may include any text that includes personal information. For example, the training data may be obtained from logs of actual customer support messages between a company and customers of the company.

At step 520, the training data is annotated with labels corresponding to the personal information in the training data. For example, the training data may be modified to replace the personal information with the label so that the training data appears similar to the redacted text of FIGS. 1A and 1B. The training data may be annotated using any appropriate techniques. For example, one or more people may review the training data and mark words of the training data as corresponding to classes of personal information.

At step 530, the annotated training data is used to train a mathematical model, such as a neural network. During the training process, the texts (e.g., all text of a customer support session or text of a message) of the training data may be processed sequentially to learn or train the parameters of the mathematical model. For example, where the model is a neural network the text of the training data may be input to the neural network, the output of the neural network may be set to the annotated labels, and back propagation may be used to learn the parameters of the neural network.

In some implementations, where a conditional random field is used to process label scores, that training process may include maximizing a training score (such as a probability or a likelihood) for a correct sequence of labels and minimizing the training scores for incorrect sequences of labels. For example, a probability for the sequence of labels $l_1, \ldots, l_N$ may be computed as $$p(l_1, \ldots, l_N | y_1, \ldots, y_N) = \frac{\exp(s(y_1, \ldots, y_N; l_1, \ldots, l_N))}{\sum_{\hat{l}_1, \ldots, \hat{l}_N} \exp(s(y_1, \ldots, y_N; \hat{l}_1, \ldots, \hat{l}_N))}$$

where $y_1, \ldots, y_N$ are label scores for a text of the training data; exp indicates the exponential function; s is as defined above; and the summation in the denominator is over all possible sequences of labels.

The probability of the correct sequence can be maximized by minimizing the negative log probability of the correct sequence given by:

$$\log(p(l_1^*, \ldots, l_N^* | y_1, \ldots, y_N)) = s(y_1, \ldots, y_N; l_1^*, \ldots, l_N^*) - \log(\Sigma_{\hat{l}_1, \ldots, \hat{l}_N} \exp(s(y_1, \ldots, y_N; \hat{l}_1, \ldots, \hat{l}_N)))$$

where $l_1^*, \ldots, l_N^*$ are the annotations of the training text. The minimization may be performed using stochastic gradient descent (or any other appropriate algorithm) and may be performed efficiently using dynamic programming.

After the model has been trained, it may be used to label personal information in text using any of the techniques described herein.

In certain implementations, model operations such as those described with regard to FIGS. 3 through 5 may be used to additionally or alternatively provide a general category, a source category, and/or a source entity or law corresponding to a redacted element of the text. For example, where a label instance appears in the redacted text, in certain implementations, the related category of personal information may be associated with the label (e.g., medical, PII, business transaction, confidential information, etc.). In certain implementations, the related category of personal information may be stored in relation to the label (e.g., as a property of the label)—which may be in a many-to-many relationship. For example, a specific label may be identified (e.g., as defined by a user) as having a general category of PII and medical. In another example, a specific label (e.g., a project name) may be identified as a business transaction and/or confidential information.

In certain implementations, a source category may be identified with a label, and/or in the training data annotations of the labels, to provide source information where terms are trained to be understood as personal information (or information to be otherwise redacted). Accordingly, the operations of a system such as that described in regard to FIG. 4 can display (e.g., with the label) and/or embed (e.g., as metadata, or selectively visible data) source information (e.g., PII regulations, company privacy policy, medical information, insider information, and/or proprietary information) for the rules or determinations that led to a particular word (or group of words) being labeled as personal information.

In certain implementations, a source entity or law may be identified with a label, and/or in the training data annotations of the labels, to provide a source entity or law where terms are trained to be understood as personal information (or information to be otherwise redacted). Accordingly, the operations of a system such as that described in regard to FIG. 4 can display (e.g., with the label) and/or embed (e.g., as metadata, or selectively visible data) the source entity or law (e.g., ACME company, SEC, HIPAA, Data Protection Directive, etc.) for the rules or determinations that led to a particular word (or group of words) being labeled as personal information. Information such as the general category, source category, and/or source entity or law can be utilized to allow for the redacted text to be used flexibly in various contexts with confidence that the goals for redaction are met, to allow multiple versions of the redacted data to be generated rapidly for various purposes of the redacted text, to annotate the redacted data to facilitate review of redacted data for a human reviewer, for reporting to regulatory bodies or third-parties where a host of the original text and/or redacted text may have a reporting responsibility, and/or to facilitate updating of a redaction system to changes in particular laws, regulations, policies, or business events (e.g., such as after public disclosure of business events, changes in internal programs or confidentiality classifications, etc.).

Figure 6:
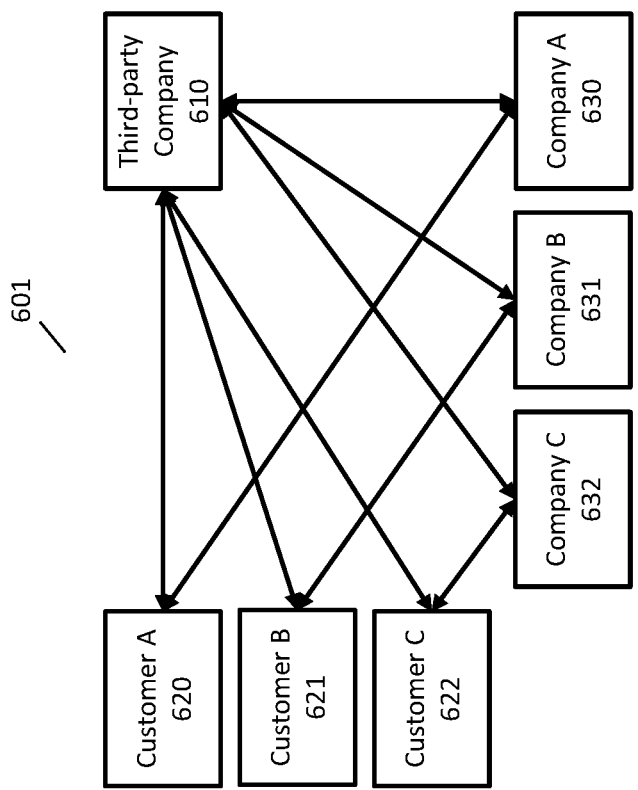
FIG. 6 is an exemplary system whereby a third-party company provides text redacting services to other companies.

FIG. 6 is an example system 601 that allows a third-party company 610 to provide services to multiple companies relating to removing personal information from text. In some implementations, services for removing personal information from text may be provided in conjunction with other services, such as services relating to the third-party company assisting one or more of the multiple companies in providing customer support to their customers.

In FIG. 6, third-party company 610 is providing services to company A 630, company B 631, and company C 632. Third-party company 610 may provide customer support services to any number of companies. Customers of each company may seek customer support from a company where the support process uses the services of third-party company 610. For example, customer A 620 may be seeking support from company A 630, customer B 621 may be seeking support from company B 631, and customer C 622 may be seeking support from company C 632. It may or may not be apparent to the customers whether they are seeking customer support directly from the company or using services of third-party company 610.

Third-party company 610 may assist a company in providing customer support in a variety of ways. In some implementations, third-party company 610 may assist in connecting a customer with a customer service representative working on behalf of the company. For example, third-party company 610 may select a customer service representative, may provide a user interface to a customer to make it easier for a customer to request support, and may provide a user interface to a customer service representative to assist the customer service representative in responding to a request of a customer. A customer service representative may have any appropriate relationship with the company on behalf of which it is providing customer support. For example, a customer service representative may be an employee or contractor of a company and providing customer support to only customers of that company, or a customer service representative may be providing services to multiple companies and providing support to customers of the multiple companies at the same time.

The network communications between third-party company 610, customers, and companies may be architected in a variety of ways. In some implementations, all network communications between a customer and a company may be via third-party company 610 and there may not be any direct connection between the customer and the company. In some implementations, third-party company 610 may have network connections with the company but may not directly with the customer. In some implementations, a customer may have network connections with the company and also with third-party company 610.

Where a customer has network connections with both a company and third-party company 610, each of the two connections may be used for different kinds of requests. For example, where the customer is interacting with the company in a way that does not require the services of third-party company 610 (e.g., navigating a web site of the company), the customer may use the network connection with the company. Where the customer is interacting with the company in a way that uses the services of third-party company 610, the customer may use the network connection with third-party company. It may not be apparent to the customer whether the customer is using a network connection with the company or with third-party company 610.

In some implementations, third-party company 610 may remove personal information from text received from customers and present the redacted text to a customer service representative. For example, it may be desired that customer service representatives not have access to certain personal information, such as credit card numbers or social security numbers. In certain implementations, partially redacted text or redacted text may be provided to the customer service representative, and original text or another version of the partially redacted text or redacted text may be used elsewhere in a system such as system 601 or system 701.

In some implementations, third-party company 610 may remove personal information from text before the text is placed in longer term storage, such as a database for storing information from customer support sessions. Storing redacted text in longer term storage may reduce privacy concerns and/or liability risks from storing sensitive information. In certain implementations, original text may be stored in a first location (e.g., on a secure server, in a specific jurisdiction, and/or for a specified time period) and one or more versions of partially redacted text and/or redacted text may be stored in a second location (e.g., on a less secure server, in other specific jurisdictions, and/or for a second specified time period). It can be seen that the purposes of creation and use of partially redacted and/or redacted text are relevant to the trajectory (e.g., communication routes, storage location, storage time, and/or access to the text) of the original, partially redacted, and redacted text data for a contemplated system 601.

One of skill in the art, having the benefit of the present disclosure and information ordinarily available when contemplating a particular system, can readily determine the storage and communication parameters for versions of the partially redacted text, redacted text, and original text. Certain considerations for determining the storage and communication parameters include, without limitation: the type of personal information included within the original text and/or versions of the partially redacted and/or redacted text; the geographic locations of any related entity to the system (e.g., a third-party company, customers, one or more of the multiple companies, a data originator, a data end user, and/or data intermediate users); regulations of one or more relevant jurisdictions to the system; policies of one or more of any related entity to the system; confidentiality policies, agreements, and/or obligations of any one or more of any related entity to the system; time considerations relating to the personal information (e.g., duration of any confidentiality obligation, timing of a business event, timing and execution of data backup events, time values related to any obligations of an entity related to the system such as contractual obligations from a source provided to the third-party company, etc.). The described examples are illustrative and non-limiting.

Figure 7:
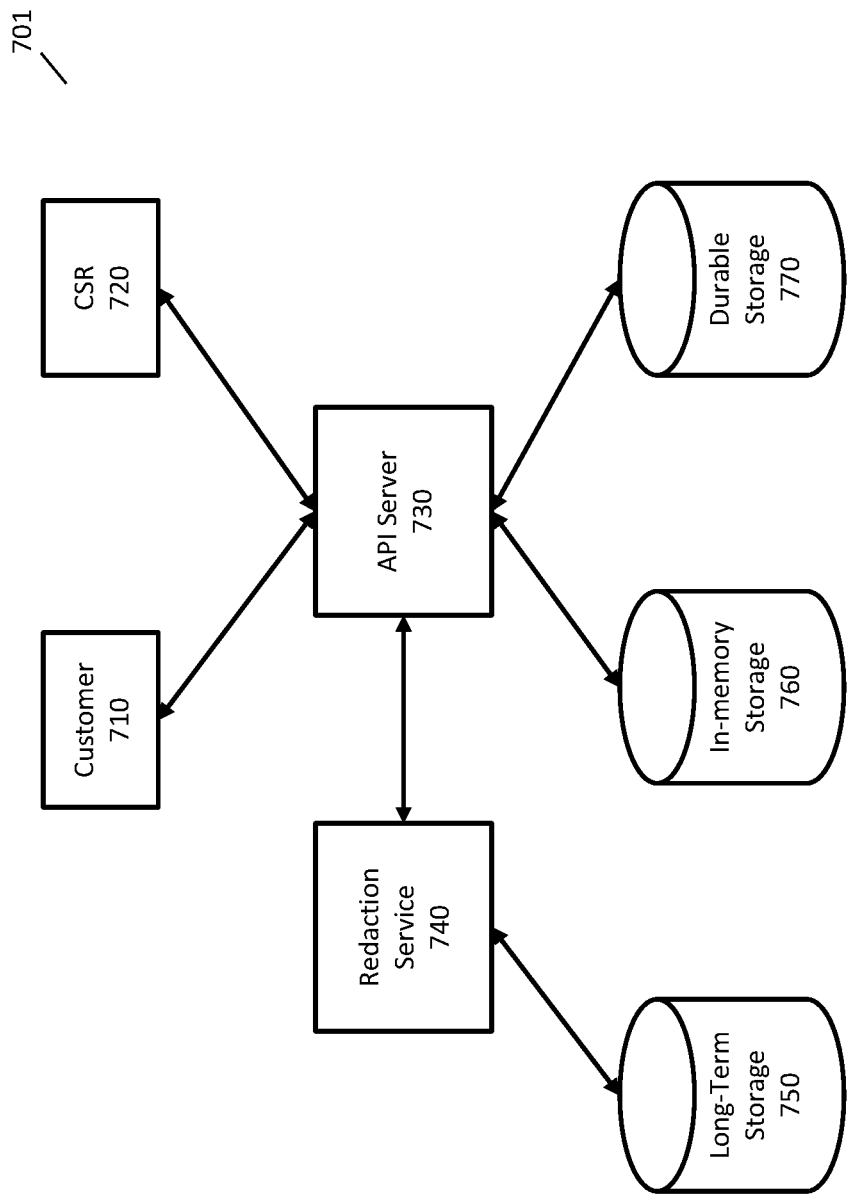
FIG. 7 is an exemplary system for providing customer support where text is stored with different levels of redaction.

FIG. 7 is an exemplary system 701 for providing customer support where text is stored with difference levels of redaction. System 701 may be implemented by a company for providing customer support to its own customers, by a third-party company providing services to companies, or a combination thereof. In system 701, customer 710 is requesting customer support, and the customer support may be provided using customer service representative (CSR) 720 or using automated support techniques.

In FIG. 7, API server 730 may perform any appropriate techniques to provide customer service to customer 710. For example, where customer 710 is receiving assistance from CSR 720, API server 730 may transmit a communication from customer 710 to CSR 720, and may transmit a communication from CSR 720 back to customer 710. Where customer 710 is receiving automated support, API server 730 may cause the customer communication to be processed by an automated support service (not shown) and transmit a result of the automated support back to customer 710.

API server 730 may communicate with redaction service 740 to perform any of the redaction techniques described herein, including but not limited to generating redacted text by replacing personal information with labels indicating the type of personal information that was removed, and/or generating partially-redacted text, such as replacing digits with a token (e.g., "#"). API server 730 may store text, partially redacted text, redacted text, and/or versions thereof, in various storage locations, such as any of in-memory storage 760, durable storage 770, or long-term storage 750.

The connections between components of system 701 are exemplary and not limiting. For example, API server 730 may use redaction service 740 to redact personal information from text, receive the redacted text back from redaction service 740, and then store the redacted text in any of the storage locations. Alternatively, API server 730 may instruct redaction service 740 to perform the redaction and then redaction service 740 may store the redacted text in any of the storage locations.

Figure 8:
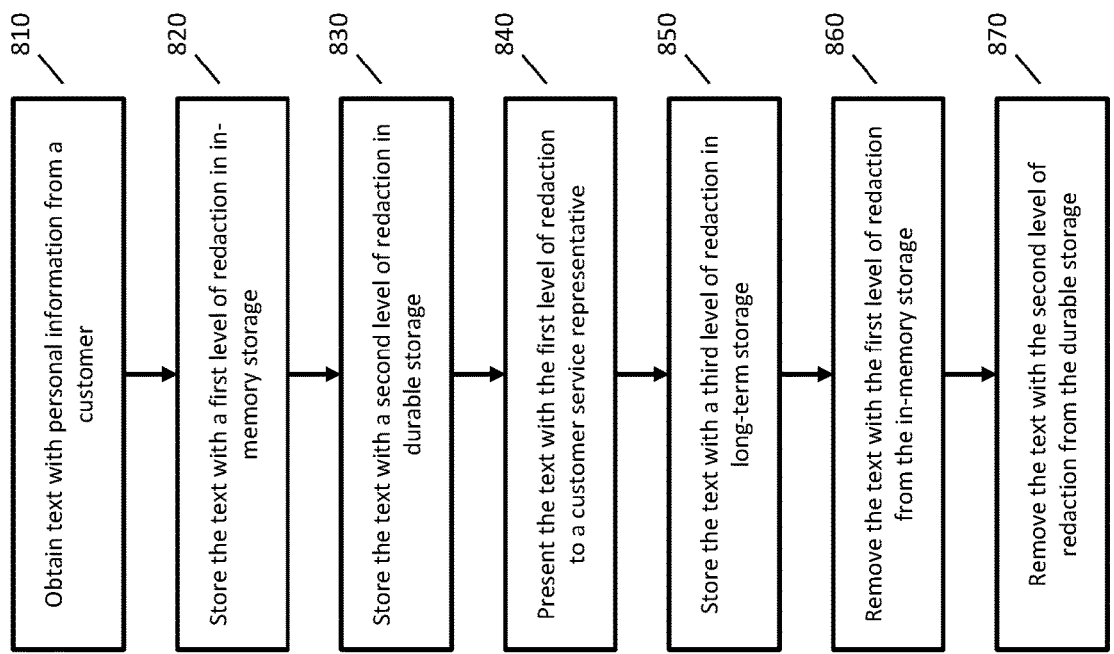
FIG. 8 is a flowchart of an example implementation of providing customer support where text is stored with different levels of redaction.

FIG. 8 is a flowchart of an example implementation of providing customer support with different levels of redaction, which may be performed using system 601, system 701, or any other appropriate system.

At step 810, text is obtained that includes personal information. For example, a communication may be received from the customer that includes information such as a name, address, social security number, or credit card number. The customer communication may be received by API server 730 using any appropriate techniques. For example, software running on a device of the customer may transmit a communication to API server 730 by performing a REST API call that includes the communication. Where the communication includes speech, text may be obtained from the speech using automatic speech recognition.

At step 820, the text is stored with a first level of redaction in in-memory storage 760. In-memory storage 760 may be any form of storage for storing text for a relatively short period of time, such as for the duration of a customer support session or for a time period of less than one day. In-memory storage 760 may be implemented using any appropriate techniques, such as any volatile storage, an in-memory database or an in-memory key-value store. With in-memory storage 760, the stored information may not be durable since the information may be lost if the computer crashes, loses power, or is restarted.

In-memory storage 760 may be used to facilitate communications between customer 710 and CSR 720 or for automated processing. In-memory storage 760 may provide faster access to information than storage on disk since accessing information from memory is generally faster than accessing information from disk. Storing information using in-memory storage 760 may provide a better customer support experience for customer 710 because responses to customer 710 may be sent more quickly.

The first level of redaction for the text stored in in-memory storage 760 may be a lowest level of redaction (i.e., retaining the most information). For example, the first level of redaction may be no redaction at all or only redacting the most sensitive information, such as credit card numbers or social security numbers or portions thereof (e.g., the redaction may include removing all but the last 4 digits of a social security number or a credit card number). A lowest level of redaction may be used for in-memory storage 760 because the storage is not durable and because the storage may be for a shorter period of time (e.g., for the duration of a customer support session). In-memory storage 760 may be a safer place to store more sensitive information because of the inherently short-term nature of the storage.

In some implementations, in-memory storage 760 may be modified to perform further redactions at a later time. In some implementations, for each entry in in-memory storage 760, a time deadline may be set so that information is redacted after that deadline. For example, unredacted text may be stored in in-memory storage 760, but after 5 minutes, the text may be redacted to remove some personal information.

At step 830, the text is stored with a second level of redaction in durable storage 770. Durable storage 770 may be any form of storage using durable storage techniques. Durable storage 770 may be implemented using any appropriate storage techniques, such as any nonvolatile storage or any database stored to disk.

The second level of redaction for text stored in durable storage 770 may be a higher level of redaction than the first level of redaction. Because durable storage 770 may store information to disk, there may be increased liability or privacy concerns. For example, the second level of redaction may include always redacting credit card numbers and social security numbers to reduce the liability of storing sensitive information.

Durable storage 770 may be used for any appropriate purposes by the company. For example, durable storage 770 may be used to create logs of the customer support process, or durable storage may be a backup for in-memory storage 760 (e.g., if the computer of in-memory storage 760 is restarted). Because durable storage 770 may contain some personal information, access to durable storage 770 may be restricted to protect the privacy of customers. In some implementations, the text may be stored on durable storage 770 for a limited period of time, such as a maximum retention period for storing customer service logs.

At step 840, the text with the first level of redaction may be presented to CSR 720. This step may be performed before step 830 or step 820 or may not be performed at all (e.g., where automated support is being provided).

At step 850, the text is stored with a third level of redaction in long-term storage 750. Long-term storage 750 may be implemented using any appropriate storage techniques, such as any nonvolatile storage or any appropriate database.

The third level of redaction for text stored in long-term storage 750 may be a highest level of redaction that is higher than both the first and second levels of redaction. The text with the third level of redaction may be used for a wider array of purposes and applications, such as for research purposes or as a training corpus for training models or classifiers. In some implementations, the text with the third level of redaction may seek to remove all personal information (including lower sensitivity information, such as names and addresses) to allow the information to be used with impacting the privacy rights of customers.

At step 860, the text with the first level of redaction is removed from in-memory storage 760, and at step 870, the text with the second level of redaction is removed from durable storage 770. These two steps may be performed at any appropriate time using any appropriate techniques. For example, the text with the first level of redaction may be removed from in-memory storage 760 soon after the completion of the customer service session with customer 710 or at the end of an hour or day. The text with the second level of redaction may be removed from durable storage 770 according to a company policy for retaining personal information of customers.

While the example descriptions include operations to increase a level of redaction over time (e.g., a higher redaction level, or higher level of redaction)—for example to store text having a first level of redaction, and increasing the level of redaction at a later time, it is understood that the level of redaction may additionally or alternatively be reduced over time. For example, where a first redaction occurs that does not apply at a later time (e.g., a business transaction has occurred, or a confidentiality obligation has expired), and/or where a need for reduced redaction arises after a time period (e.g., a patient in a long-term clinical trial is contacted after a selected time period, where a contact in the interim time period is not needed), then a redaction level may "decrease" at a later time. In certain implementations, a redaction level may increase in some aspects over time, and decrease in other aspects over time. In certain implementations, data may be stored in a first jurisdiction at a first time having a regulatory requirement for a first set of redaction rules for personal information, and the data may be stored in a second jurisdiction at a second time have a different regulatory requirement with a second set of redaction rules for personal information, which may be more or less strict than the first set of redaction rules, and/or a mixture of aspects that are more strict in some regards and less strict in other regards. In certain implementations, a change in the redaction level and/or redaction rules over time and/or with regard to geographical locations of the data and/or entities related to the system, is contemplated herein.

Certain aspects of the present description are described with a relative "higher level of redaction" or "lower level of redaction," or with similar terms. In certain implementations, a higher level of redaction indicates that more of the original text has been redacted. In certain implementations, a higher level of redaction indicates that a more stringent redaction rule has been applied to the text, where in certain implementations the redacted text may be identical to the text operating on a lower level of redaction. In certain implementations, a higher level of redaction indicates that a different rule set or scoring is applied for the redaction relative to a lower level of redaction, which rule set or scoring may be more stringent (e.g., tending to redact more of the original text) in certain aspects and less stringent (e.g., tending to redact less of the original text) in other aspects. In certain implementations redacted text according to a higher level of redaction may include one or more elements of the original text that are not redacted, but that are redacted in the redacted text according to the lower level of redaction. In certain implementations, one or more versions of text having a lower level of redaction may be partially redacted text. In certain implementations, text having a lower level of redaction and/or a higher level of redaction may be redacted text, for example including one or more labels inserted at a redaction position.

A company may use stored redacted text for a variety of applications. For example, a company may desire to train text classifiers using the redacted text that is stored in long-term storage 750. The redacting procedures described herein may allow for increased performance in the training of a classifier than with other techniques for redacting data. Where redacted data replaces personal information with generic information (e.g., one or more "X" characters for redacted text), information about the type of information that was removed is no longer available and thus not available when training the classifier. By replacing personal information with a label that indicates the type of personal information that was removed, more information is available to the classifier, and thus the classifier may perform better. In certain implementations, the inclusion of a general category, a source category, and/or a source entity or law with the label further enhances the operations of the classifier. As described throughout the present disclosure, any one or more of the general category, source category, and/or source entity or law are optional and non-limiting, and may be included as a part of the label, separate from the label, and/or as metadata with the redacted text.

For example, a company may train a classifier for detecting events in customer support sessions, for detecting messages with an undesirable tone, for determining to transfer a customer from human provided support to automated support, for determining when to dispatch a technician to solve a problem, for determining an intent of a message, or to suggest to a customer service representative to upsell a product or service to customers. Examples of classification techniques that may be used with redacted data include any of the classification techniques described in U.S. patent application Ser. No. 15/922,662, filed on 15 Mar. 2018 (including, without limitation, descriptions relating to the topic classifier 1150, the topic model 1140, and operational descriptions relating to FIGS. 2, 8, 9, and 12); Ser. No. 15/863,225, filed on 5 Jan. 2018 (previously referenced) (including, without limitation, descriptions relating to the classification layer 450 and message classifier 923); Ser. No. 15/836,110, filed on 8 Dec. 2017 (including, without limitation, descriptions relating to the support classifier 823, and operational descriptions relating to FIG. 6); Ser. No. 15/649,061, filed on 13 Jul. 2017 (including, without limitation, descriptions relating to determining and outputting a classification decision); Ser. No. 15/638,543, filed on 30 Jun. 2017 (including, without limitation, descriptions relating to the semantic response 455, semantic processing 923, and operational descriptions relating to FIGS. 2, 5B, 7, and determining an intent); or Ser. No. 15/448,824, filed on 3 Mar. 2017 (including, without limitation, descriptions relating to upsell component 232 and operational descriptions relating to FIGS. 4-7); each of which is incorporated by reference in its entirety.

Figure 9:
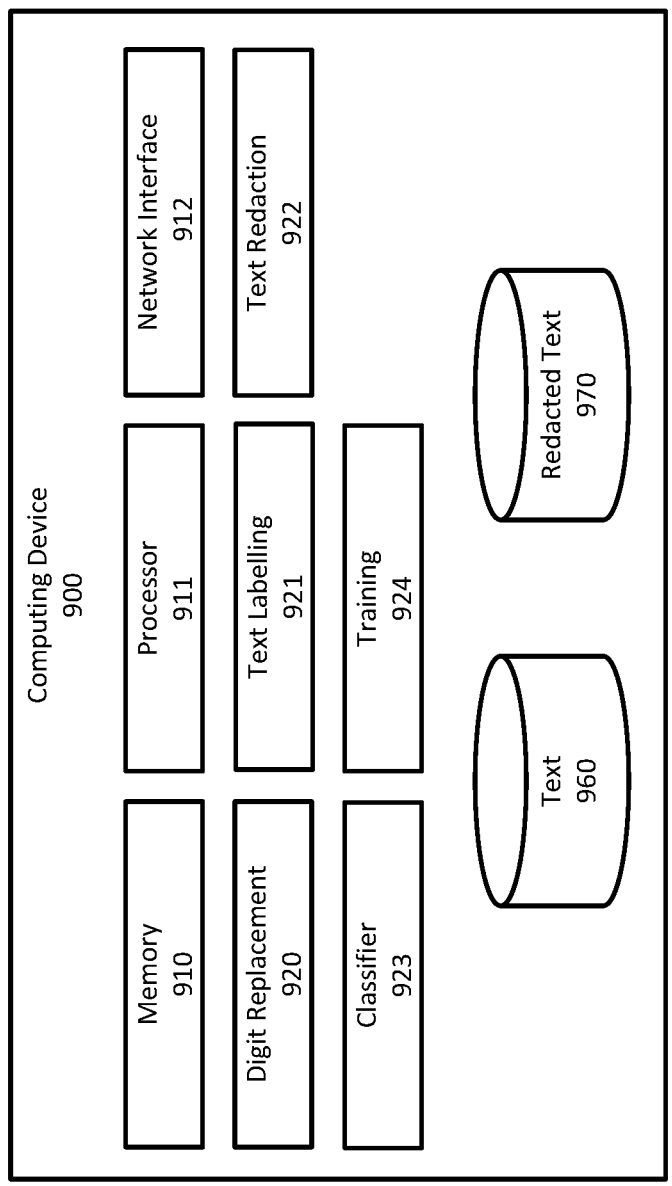
FIG. 9 is an exemplary computing device that may be used to redact text.

FIG. 9 illustrates components of one implementation of a computing device 900 for implementing any of the techniques described above. In FIG. 9, the components are shown as being on a single computing device, but the components may be distributed among multiple computing devices, such as a system of computing devices, including, for example, an end-user computing device (e.g., a smart phone or a tablet) and/or a server computing device (e.g., cloud computing).

Computing device 900 may include any components typical of a computing device, such as volatile or nonvolatile memory 910, one or more processors 911, and one or more network interfaces 912. Computing device 900 may also include any input and output components, such as displays, keyboards, and touch screens. Computing device 900 may also include a variety of components or modules providing specific functionality, and these components or modules may be implemented in software, hardware, or a combination thereof. Below, several examples of components are described for one example implementation, and other implementations may include additional components or exclude some of the components described below.

Computing device 900 may have a digit replacement component 920 that may process text to replace digits with other tokens or characters or may perform other replacements as described above. Computing device 900 may have a text labelling component 921 that may determine labels for words, such as by using any of the techniques described herein. Computing device 900 may have a text redacting component 922 that may replace portions of text including personal information with labels indicating a type of class of text that was previously present, such as by using any of the techniques described herein. Computing device 900 may have a classifier component 923 that may process redacted text, such as by using any of the classifiers described herein or in the incorporated patent documents. Computing device 900 may have a training component 924 that may train any of the models described herein using a training corpus of data.

Computing device 900 may include or have access to various data stores, such as data stores 960 and 970. Data stores may use any known storage technology such as files or relational, non-relational databases, or any non-transitory computer-readable media. For example, computing device 900 may have text data store 960 to store text before the text is redacted and a redacted text data store 970 to store redacted text.

An example method for removing personal information from text using a neural network includes obtaining the neural network, where the neural network is configured to process the text and to select a label from a number of possible labels for each word of the text, where each label corresponds to a class of words, and where at least one label corresponds to a class of words to be removed from the text; receiving the text; obtaining a word embedding for each word of the text, where a word embedding represents a word in a vector space; computing a context vector for each word of the text by processing the word embeddings with a first layer of the neural network, where a context vector for a given word includes information about words before or after the given word; computing label scores for each word of the text by processing each of the context vectors with a second layer of the neural network, where each label score indicates a match between a word and a class of words; selecting a label for each word of the text by processing the label scores with a third layer of the neural network; and generating redacted text by replacing a first word of the text with a first label corresponding to the first word.

Certain further aspects of the example method are described following, any one or more of which may be present in certain embodiments. An example method further includes causing the redacted text to be presented to a person; classifying the redacted text by processing the redacted text with a text classifier; where the first layer is a recurrent neural network layer or a bidirectional recurrent neural network layer; where the second layer includes a classifier; where the third layer includes a conditional random field; where the text is from a message received from a customer of a company and relates to obtaining support from the company; and/or performing operations including storing the redacted text in a first data store, generating second redacted text, where the second redacted text has a higher redaction level than the redacted text, and storing the second redacted text in a second data store.

An example system for removing personal information from text using a neural network includes at least one computer configured to: obtain the neural network, where the neural network is configured to process the text and select a label from a number of possible labels for each word of the text, where each label corresponds to a class of words, and where each label corresponds to a class of words, and where each label corresponds to a class of words to be removed from the text; receive the text; obtain a word embedding for each word of the text; compute a context vector for each word of the text by processing the word embedding with a first layer of the neural network; compute label scores for each word of the text by processing each of the context vectors with a second layer of the neural network, where each label score indicates a match between a word and a class of words; select a label for each word of the text by processing the label scores with a third layer of the neural network; and generate redacted text by replacing a first word of the text with a first label corresponding to the first word.

Certain further aspects of the example system are described following, any one or more of which may be present in certain embodiments. An example system further includes the computer(s) further configured to: obtain a word embedding by obtaining a first embedding corresponding to words of a vocabulary, obtain character embeddings for characters of the word, where each character embedding corresponds to a character of a set of characters computing a second embedding using the character embeddings, and obtaining the word embedding by combining the first embedding and the second embedding. An example system further includes the computer(s) further configured to generate linguistic features for each word of the text computing the label scores for each word of the text by processing the linguistic features with the second layer. An example system further includes: where the second layer includes a multi-layer perceptron; where the at least one computer(s) is further configured to: generate the redacted text by replacing sequences of a label with a single label, and/or replace digits in the text with a token that represents the replaced digits before obtaining the word embedding for each word of the text; and/or where the system is implemented by a third party providing services to a number of companies.

An example non-transitory computer-readable media includes computer executable instructions that, when executed, cause at least one processor to perform actions including: obtaining a neural network, where the neural network is configured to process text and select a label from a number of possible labels for each word of the text, where each label corresponds to a class of words, and where at least one label corresponds to a class of words to be removed from the text; receiving the text; obtaining a word embedding for each word of the text computing a context vector for each word of the text by processing the word embeddings with a first layer of the neural network; computing label scores for each word of the text by processing each of the context vectors with a second layer of the neural network, where each label score indicates a match between a word and a class of words; selecting a label for each word of the text by processing the label scores with a third layer of the neural network; and generating redacted text by replacing a first word of the text with a first label corresponding to the first word.

Certain further aspects of the example non-transitory computer-readable media are described following, any one or more of which may be present in certain embodiments. An example non-transitory computer-readable media includes: where a context vector of a word corresponds to a hidden state vector of the first layer of the neural network; where a context vector of a word corresponds to a hidden state vector of the first layer of the neural network; where the first layer of the neural network is a convolutional layer; where the third layer includes a sequence model; and/or where generating the redacted text includes removing personally identifiable information from the text.

The methods and systems described herein may be deployed in part or in whole through a machine that executes computer software, program codes, and/or instructions on a processor. "Processor" as used herein is meant to include at least one processor and unless context clearly indicates otherwise, the plural and the singular should be understood to be interchangeable. Any aspects of the present disclosure may be implemented as a method on the machine, as a system or apparatus as part of or in relation to the machine, or as a computer program product embodied in a computer readable medium executing on one or more of the machines. The processor may be part of a server computer, client, network infrastructure, mobile computing platform, stationary computing platform, or other computing platform. A processor may be any kind of computational or processing device capable of executing program instructions, codes, binary instructions and the like. The processor may be or include a signal processor, digital processor, embedded processor, microprocessor or any variant such as a co-processor (math co-processor, graphic co-processor, communication co-processor and the like) and the like that may directly or indirectly facilitate execution of program code or program instructions stored thereon. In addition, the processor may enable execution of multiple programs, threads, and codes. The threads may be executed simultaneously to enhance the performance of the processor and to facilitate simultaneous operations of the application. By way of implementation, methods, program codes, program instructions and the like described herein may be implemented in one or more thread. The thread may spawn other threads that may have assigned priorities associated with them; the processor may execute these threads based on priority or any other order based on instructions provided in the program code. The processor may include memory that stores methods, codes, instructions and programs as described herein and elsewhere. The processor may access a storage medium through an interface that may store methods, codes, and instructions as described herein and elsewhere. The storage medium associated with the processor for storing methods, programs, codes, program instructions or other type of instructions capable of being executed by the computing or processing device may include but may not be limited to one or more of a CD-ROM, DVD, memory, hard disk, flash drive, RAM, ROM, cache and the like.

A processor may include one or more cores that may enhance speed and performance of a multiprocessor. In embodiments, the process may be a dual core processor, quad core processors, other chip-level multiprocessor and the like that combine two or more independent cores (called a die).

The methods and systems described herein may be deployed in part or in whole through a machine that executes computer software on a server, client, firewall, gateway, hub, router, or other such computer and/or networking hardware. The software program may be associated with a server that may include a file server, print server, domain server, internet server, intranet server and other variants such as secondary server, host server, distributed server and the like. The server may include one or more of memories, processors, computer readable media, storage media, ports (physical and virtual), communication devices, and interfaces capable of accessing other servers, clients, machines, and devices through a wired or a wireless medium, and the like. The methods, programs, or codes as described herein and elsewhere may be executed by the server. In addition, other devices required for execution of methods as described in this application may be considered as a part of the infrastructure associated with the server.

The server may provide an interface to other devices including, without limitation, clients, other servers, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the server through an interface may include at least one storage medium capable of storing methods, programs, code and/or instructions. A central repository may provide program instructions to be executed on different devices. In this implementation, the remote repository may act as a storage medium for program code, instructions, and programs.

The software program may be associated with a client that may include a file client, print client, domain client, internet client, intranet client and other variants such as secondary client, host client, distributed client and the like. The client may include one or more of memories, processors, computer readable media, storage media, ports (physical and virtual), communication devices, and interfaces capable of accessing other clients, servers, machines, and devices through a wired or a wireless medium, and the like. The methods, programs, or codes as described herein and elsewhere may be executed by the client. In addition, other devices required for execution of methods as described in this application may be considered as a part of the infrastructure associated with the client.

The client may provide an interface to other devices including, without limitation, servers, other clients, printers, database servers, print servers, file servers, communication servers, distributed servers and the like. Additionally, this coupling and/or connection may facilitate remote execution of program across the network. The networking of some or all of these devices may facilitate parallel processing of a program or method at one or more locations without deviating from the scope of the disclosure. In addition, any of the devices attached to the client through an interface may include at least one storage medium capable of storing methods, programs, applications, code and/or instructions. A central repository may provide program instructions to be executed on different devices. In this implementation, the remote repository may act as a storage medium for program code, instructions, and programs.

The methods and systems described herein may be deployed in part or in whole through network infrastructures. The network infrastructure may include elements such as computing devices, servers, routers, hubs, firewalls, clients, personal computers, communication devices, routing devices and other active and passive devices, modules and/or components as known in the art. The computing and/or non-computing device(s) associated with the network infrastructure may include, apart from other components, a storage medium such as flash memory, buffer, stack, RAM, ROM and the like. The processes, methods, program codes, instructions described herein and elsewhere may be executed by one or more of the network infrastructural elements.

The methods, program codes, and instructions described herein and elsewhere may be implemented on a cellular network having multiple cells. The cellular network may either be frequency division multiple access (FDMA) network or code division multiple access (CDMA) network. The cellular network may include mobile devices, cell sites, base stations, repeaters, antennas, towers, and the like. The cell network may be a GSM, GPRS, 3G, EVDO, mesh, or other networks types.

The methods, programs codes, and instructions described herein and elsewhere may be implemented on or through mobile devices. The mobile devices may include navigation devices, cell phones, mobile phones, mobile personal digital assistants, laptops, palmtops, netbooks, pagers, electronic books readers, music players and the like. These devices may include, apart from other components, a storage medium such as a flash memory, buffer, RAM, ROM and one or more computing devices. The computing devices associated with mobile devices may be enabled to execute program codes, methods, and instructions stored thereon. Alternatively, the mobile devices may be configured to execute instructions in collaboration with other devices. The mobile devices may communicate with base stations interfaced with servers and configured to execute program codes. The mobile devices may communicate on a peer-to-peer network, mesh network, or other communications network. The program code may be stored on the storage medium associated with the server and executed by a computing device embedded within the server. The base station may include a computing device and a storage medium. The storage device may store program codes and instructions executed by the computing devices associated with the base station.

The computer software, program codes, and/or instructions may be stored and/or accessed on machine readable media that may include: computer components, devices, and recording media that retain digital data used for computing for some interval of time; semiconductor storage known as random access memory (RAM); mass storage typically for more permanent storage, such as optical discs, forms of magnetic storage like hard disks, tapes, drums, cards and other types; processor registers, cache memory, volatile memory, non-volatile memory; optical storage such as CD, DVD; removable media such as flash memory (e.g. USB sticks or keys), floppy disks, magnetic tape, paper tape, punch cards, standalone RAM disks, Zip drives, removable mass storage, off-line, and the like; other computer memory such as dynamic memory, static memory, read/write storage, mutable storage, read only, random access, sequential access, location addressable, file addressable, content addressable, network attached storage, storage area network, bar codes, magnetic ink, and the like.

The methods and systems described herein may transform physical and/or or intangible items from one state to another. The methods and systems described herein may also transform data representing physical and/or intangible items from one state to another.

The elements described and depicted herein, including in flow charts and block diagrams throughout the figures, imply logical boundaries between the elements. However, according to software or hardware engineering practices, the depicted elements and the functions thereof may be implemented on machines through computer executable media having a processor capable of executing program instructions stored thereon as a monolithic software structure, as standalone software modules, or as modules that employ external routines, code, services, and so forth, or any combination of these, and all such implementations may be within the scope of the present disclosure. Examples of such machines may include, but may not be limited to, personal digital assistants, laptops, personal computers, mobile phones, other handheld computing devices, medical equipment, wired or wireless communication devices, transducers, chips, calculators, satellites, tablet PCs, electronic books, gadgets, electronic devices, devices having artificial intelligence, computing devices, networking equipment, servers, routers and the like. Furthermore, the elements depicted in the flow chart and block diagrams or any other logical component may be implemented on a machine capable of executing program instructions. Thus, while the foregoing drawings and descriptions set forth functional aspects of the disclosed systems, no particular arrangement of software for implementing these functional aspects should be inferred from these descriptions unless explicitly stated or otherwise clear from the context. Similarly, it will be appreciated that the various steps identified and described above may be varied, and that the order of steps may be adapted to particular applications of the techniques disclosed herein. All such variations and modifications are intended to fall within the scope of this disclosure. As such, the depiction and/or description of an order for various steps should not be understood to require a particular order of execution for those steps, unless required by a particular application, or explicitly stated or otherwise clear from the context.

The methods and/or processes described above, and steps thereof, may be realized in hardware, software or any combination of hardware and software suitable for a particular application. The hardware may include a general-purpose computer and/or dedicated computing device or specific computing device or particular aspect or component of a specific computing device. The processes may be realized in one or more microprocessors, microcontrollers, embedded microcontrollers, programmable digital signal processors or other programmable device, along with internal and/or external memory. The processes may also, or instead, be embodied in an application specific integrated circuit, a programmable gate array, programmable array logic, or any other device or combination of devices that may be configured to process electronic signals. It will further be appreciated that one or more of the processes may be realized as a computer executable code capable of being executed on a machine-readable medium.

The computer executable code may be created using a structured programming language such as C, an object oriented programming language such as C++, or any other high-level or low-level programming language (including assembly languages, hardware description languages, and database programming languages and technologies) that may be stored, compiled or interpreted to run on one of the above devices, as well as heterogeneous combinations of processors, processor architectures, or combinations of different hardware and software, or any other machine capable of executing program instructions.

Thus, in one aspect, each method described above and combinations thereof may be embodied in computer executable code that, when executing on one or more computing devices, performs the steps thereof. In another aspect, the methods may be embodied in systems that perform the steps thereof, and may be distributed across devices in a number of ways, or all of the functionality may be integrated into a dedicated, standalone device or other hardware. In another aspect, the means for performing the steps associated with the processes described above may include any of the hardware and/or software described above. All such permutations and combinations are intended to fall within the scope of the present disclosure.

While the invention has been disclosed in connection with the preferred embodiments shown and described in detail, various modifications and improvements thereon will become readily apparent to those skilled in the art. Accordingly, the spirit and scope of the present invention is not to be limited by the foregoing examples, but is to be understood in the broadest sense allowable by law.

All documents referenced herein are hereby incorporated by reference.

What is claimed is:

1. A computer-implemented method for removing personal information from text, comprising:
   receiving text of a message from a user;
   generating first redacted text by processing the text with a first level of redaction;
   storing the first redacted text in in-memory storage;
   presenting the first redacted text to a customer service representative who is assisting the user;
   removing the first redacted text from the in-memory storage after a first period of time;
   generating second redacted text by processing the text or the first redacted text with a second level of redaction, wherein:
   the second level of redaction is higher than the first level of redaction, and
   the second level of redaction replaces redacted text with a label indicating a type of information that was removed from the text;
   in response to the second level of redaction being higher than the first level of redaction, storing the second redacted text in durable storage; and
   removing the second redacted text from the durable storage after a second period of time, wherein the second period of time is longer than the first period of time.

2. The computer-implemented method of claim 1, wherein the second level of redaction is performed using a neural network.

3. The computer-implemented method of claim 2, wherein the second level of redaction comprises computing a context vector for each word of the text.

4. The computer-implemented method of claim 1, wherein the in-memory storage comprises a key-value store.

5. The computer-implemented method of claim 1, wherein the durable storage comprises a database stored to disk.

6. The computer-implemented method of claim 1, further comprising receiving the text of the message from the user as part of a customer support session between the user and the customer service representative, and wherein the first redacted text is removed from the in-memory storage in response to a conclusion of the customer support session.

7. The computer-implemented method of claim 1, wherein the second level of redaction removes at least one of a phone number, a mailing address, an email address, or a name from the text.

8. The computer-implemented method of claim 1, comprising:
   generating third redacted text by processing the text, the first redacted text, or the second redacted text with a third level of redaction, wherein:
   the third level of redaction is higher than the second level of redaction, and
   the third level of redaction replaces redacted text with a label indicating a type of information that was removed from the text;
   storing the third redacted text in second durable storage, wherein the third redacted text is stored for longer than the second period of time.

9. The computer-implemented method of claim 1, wherein the first redacted text is not stored in the durable storage.

10. A system, comprising:
    at least one computer comprising at least one processor and at least one memory, the at least one computer configured to:
    receive text of a message from a user;
    generate first redacted text by processing the text with a first level of redaction;
    store the first redacted text in in-memory storage;
    present the first redacted text to a customer service representative who is assisting the user;
    remove the first redacted text from the in-memory storage after a first period of time;
    generate second redacted text by processing the text or the first redacted text with a second level of redaction, wherein the second level of redaction is higher than the first level of redaction;
    in response to the second level of redaction being higher than the first level of redaction, store the second redacted text in durable storage;
    remove the second redacted text from the durable storage after a second period of time, wherein the second period of time is longer than the first period of time;
    generate third redacted text by processing the text, the first redacted text, or the second redacted text with a third level of redaction, wherein the third level of redaction is higher than the second level of redaction; and
    store the third redacted text in second durable storage, wherein the third redacted text is stored for longer than the second period of time.

11. The system of claim 10, wherein the third level of redaction removes all personal information from the text.

12. The system of claim 10, wherein the third level of redaction removes all numbers from the text.

13. The system of claim 10, wherein the third redacted text is used for training models or classifiers.

14. The system of claim 10, wherein:
    the second level of redaction replaces redacted text with a label indicating a type of information that was removed from the text; and
    the third level of redaction replaces redacted text with a label indicating a type of information that was removed from the text.

15. The system of claim 10, wherein the second redacted text is used for logging of customer support.

16. One or more non-transitory, computer-readable media comprising computer executable instructions that, when executed, cause at least one processor to perform actions comprising:
    receiving text of a message from a user;
    generating first redacted text by processing the text with a first level of redaction;
    storing the first redacted text in in-memory storage;

presenting the first redacted text to a customer service representative who is assisting the user;

removing the first redacted text from the in-memory storage after a first period of time;

generating second redacted text by processing the text or the first redacted text with a second level of redaction, wherein:

the second level of redaction is higher than the first level of redaction, and the second level of redaction replaces redacted text with a label indicating a type of information that was removed from the text;

in response to the second level of redaction being higher than the first level of redaction, storing the second redacted text in durable storage; and removing the second redacted text from the durable storage after a second period of time, wherein the second period of time is longer than the first period of time.

17. The one or more non-transitory, computer-readable media of claim 16, wherein the actions comprise:

generating third redacted text by processing the text, the first redacted text, or the second redacted text with a third level of redaction, wherein:

the third level of redaction is higher than the second level of redaction, and the third level of redaction replaces redacted text with a label indicating a type of information that was removed from the text; and storing the third redacted text in second durable storage, wherein the third redacted text is stored for longer than the second period of time.

18. The one or more non-transitory, computer-readable media of claim 16, wherein the first level of redaction is performed using a regular expression.

19. The one or more non-transitory, computer-readable media of claim 16, wherein the first level of redaction removes at least one of a credit card number or a social security number from the text.

20. The one or more non-transitory, computer-readable media of claim 16, wherein the first period of time is less than one hour.

21. The one or more non-transitory, computer-readable media of claim 16, wherein the second period of time is longer than one hour and less than one year.

* * * * *

UNITED STATES PATENT AND TRADEMARK OFFICE
CERTIFICATE OF CORRECTION

PATENT NO. : 10,878,181 B2  
APPLICATION NO. : 16/189337  
DATED : December 29, 2020  
INVENTOR(S) : Frederick William Poe Heckel et al.

Page 1 of 1

It is certified that error appears in the above-identified patent and that said Letters Patent is hereby corrected as shown below:

In the Specification

In Column 11, Line 16, delete "a is" and insert -- σ is --.

In Column 11, Line 18, delete "$h_o^f$ and $c_o$" and insert -- $h_0^f$ and $c_0$ --.

In Column 11, Line 36, delete "$o_t = \sigma(\tilde{U}_o x_t + \tilde{V}_o h_{t+1}^b + \hat{b}_o)$" and insert -- $o_t = \sigma(\tilde{U}_o x_t + \tilde{V}_o h_{t+1}^b + \hat{b}_o)$ --.

In Column 11, Line 37, delete "$g_t = \tanh(\tilde{U}_g x_t + \tilde{V}_g h_{t+1}^b + \hat{b}_g)$" and insert -- $g_t = \tanh(\tilde{U}_g x_t + \tilde{V}_g h_{t+1}^b + \hat{b}_g)$ --.

In Column 12, Line 32, delete "a is" and insert -- σ is --.

Signed and Sealed this  
Fourteenth Day of February, 2023

Katherine Kelly Vidal  
*Director of the United States Patent and Trademark Office*